United States Patent
Cao et al.

(10) Patent No.: US 11,912,619 B2
(45) Date of Patent: *Feb. 27, 2024

(54) TEXTURED GLASS ARTICLES AND METHODS OF MAKING SAME

(71) Applicant: Corning Incorporated, Corning, NY (US)

(72) Inventors: Xinyu Cao, Shanghai (CN); Christine Cecala, Corning, NY (US); Ling Chen, Shanghai (CN); Wanghui Chen, Shanghai (CN); Yuhui Jin, Painted Post, NY (US); Cameron Robert Nelson, Elmira, NY (US); Jayantha Senawiratne, Horseheads, NY (US); David Lee Weidman, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/462,848

(22) Filed: Aug. 31, 2021

(65) Prior Publication Data

US 2022/0073418 A1   Mar. 10, 2022

Related U.S. Application Data

(60) Provisional application No. 63/074,761, filed on Sep. 4, 2020.

(51) Int. Cl.
*C03C 3/097* (2006.01)
*C03C 3/091* (2006.01)
(Continued)

(52) U.S. Cl.
CPC .............. *C03C 3/091* (2013.01); *C03C 3/085* (2013.01); *C03C 3/097* (2013.01); *C03C 15/00* (2013.01);
(Continued)

(58) Field of Classification Search
CPC ......... C03C 3/091; C03C 3/085; C03C 3/097; C03C 15/00
See application file for complete search history.

(56) References Cited

U.S. PATENT DOCUMENTS

2018/0141854 A1   5/2018  Huang
2018/0215657 A1   8/2018  Jin
(Continued)

FOREIGN PATENT DOCUMENTS

CN    111233339 A   6/2020
EP    1614665 A1    1/2006

OTHER PUBLICATIONS

International Search Report and Written Opinion of the International Searching Authority; PCT/US2021/048445; dated Dec. 2, 2021; pp. 12; European Patent Office.

*Primary Examiner* — David Sample
*Assistant Examiner* — Donald M Flores, Jr.

(57) ABSTRACT

A textured glass article includes: a body comprising an aluminosilicate glass comprising greater than or equal to 16 wt % $Al_2O_3$, the body having at least a first surface; and a plurality of polyhedral surface features extending from the first surface, each of the plurality of polyhedral surface features comprising a base on the first surface, a plurality of facets extending from the first surface, and a surface feature size at the base greater than or equal to 10 μm and less than or equal to 350 μm, wherein the plurality of facets of each polyhedral surface feature converge toward one another.

13 Claims, 31 Drawing Sheets

(51) Int. Cl.
*C03C 3/085* (2006.01)
*C03C 15/00* (2006.01)
*C03C 23/00* (2006.01)
*C09K 13/08* (2006.01)

(52) U.S. Cl.
CPC ...... *C03C 23/0075* (2013.01); *C03C 23/0085* (2013.01); *C09K 13/08* (2013.01)

(56) References Cited

U.S. PATENT DOCUMENTS

2019/0107751 A1\* 4/2019 Bazemore ............... C03C 3/085
2022/0073412 A1\* 3/2022 Hancock, Jr. ....... C03C 23/0085

\* cited by examiner ences by means by US 11,912,619 B2

TEXTURED GLASS ARTICLES AND METHODS OF MAKING SAME

CROSS-REFERENCE TO RELATED APPLICATIONS

The present specification claims the benefit of U.S. Provisional Application Ser. No. 63/074,761 filed Sep. 4, 2020 and entitled "Textured Glass Articles and Methods of Making Same," the entirety of which is incorporated by reference herein.

FIELD

The present specification generally relates to glass articles and, in particular, to glass articles having an enhanced tactile impression and a highly reflective appearance.

TECHNICAL BACKGROUND

Aluminosilicate glass articles may exhibit superior ion-exchangeability and drop performance. Various industries, including the consumer electronics industry, desire textured, reflective materials with the same or similar strength and fracture toughness properties. However, conventional texturing processes may not produce the desired texture and appearance on certain aluminosilicate glass articles.

Accordingly, a need exists for an alternative method to produce aluminosilicate glass articles having enhanced tactile impression and a highly reflective appearance.

SUMMARY

According to a first aspect A1, a textured glass article may comprise: a body comprising an aluminosilicate glass comprising greater than or equal to 16 wt % $Al_2O_3$, the body having at least a first surface; and a plurality of polyhedral surface features extending from the first surface, each of the plurality of polyhedral surface features comprising a base on the first surface, a plurality of facets extending from the first surface, and a surface feature size at the base greater than or equal to 10 μm and less than or equal to 350 μm, wherein the plurality of facets of each polyhedral surface feature converge toward one another.

A second aspect A2 includes the article according to the first aspect A1, wherein the plurality of facets of each polyhedral surface feature converge toward one another to form at least one apex, the at least one apex being sharp, rounded, or truncated.

A third aspect A3 includes the article according to the first aspect A1 or the second aspect A2, wherein the textured glass article has a surface roughness Ra greater than or equal to 2 μm.

A fourth aspect A4 includes the article according to any one of the first through third aspects A1-A3, wherein the textured glass article has a transmittance haze greater than or equal to 40%.

A fifth aspect A5 includes the article according to any one of the first through fourth aspects A1-A4, wherein the base of each of the plurality of polyhedral surface features comprises at least three sides, at least one side converging toward at least another side.

A sixth aspect A6 includes the article according to any one of the first through fifth aspects A1-A5, wherein each of the plurality of polyhedral surface features comprises a dendritic structure extending from the base.

A seventh aspect A7 includes the article according to any one of the first through sixth aspects A1-A6, wherein the textured glass article has a mean surface roughness Sa greater than or equal to 0.75 μm and less than or equal to 10 μm.

An eighth aspect A8 includes the article according to any one of the first through seventh aspects A1-A7, wherein the textured glass article has a mean root mean square height Sq greater than or equal to 1 μm and less than or equal to 2 μm.

A ninth aspect A9 includes the article according to any one of the first through eighth aspect A1-A8, wherein the textured glass article has a mean developed interfacial area Sdr greater than or equal to 7% and less than or equal to 25%.

A tenth aspect A10 includes the article according to any one of the first through ninth aspects A1-A9, wherein the textured glass article has a fastest decay autocorrelation length Sal greater than or equal to 0.020 mm and less than or equal to 0.1 mm.

An eleventh aspect A11 includes the article according to any one of the first through tenth aspects A1-A10, wherein the textured glass article has a mean peak curvature greater than or equal to 8000 $mm^{-1}$ and less than or equal to 17000 $mm^{-1}$.

A twelfth aspect A12 includes the article according to any one of the first through eleventh aspects A1-A11, wherein the textured glass article has a location of peak maximum (peak GU) greater than or equal to 50 GU and less than or equal to 150 GU.

A thirteenth aspect A13 includes the article according to any one of the first through twelfth aspects A1-A12, wherein the textured glass article has a full width at half maximum greater than or equal to 20 GU and less than or equal to 40 GU.

A fourteenth aspect A14 includes the article according to any one of the first through thirteenth aspects A1-A13, wherein the textured glass article has a range of GU values greater than or equal to 100 GU and less than or equal to 250 GU.

A fifteenth aspect A15 includes the article according to any one of the first through fourteenth aspects A1-A14, wherein the textured glass article has a skewness greater than or equal to 0.25 and less than or equal to 0.9.

A sixteenth aspect A16 includes the article according to any one of the first through fifteenth aspects A1-A15, wherein the textured glass article has an excess kurtosis greater than or equal to 0.5 and less than or equal to 3.

A seventeenth aspect A17 includes the article according to any one of the first through sixteenth aspects A1-A16, wherein the textured glass article has a bi-directional reflectance distribution function (BRDF) spectra including at least one peak appearing at least 1° away from an angle of incidence.

An eighteenth aspect A18 includes the article according to any one of the first through seventeenth aspects A1-A17, wherein the aluminosilicate glass comprises: greater than or equal to 52 wt % and less than or equal to 62 wt % $SiO_2$; greater than or equal to 16 wt % and less than or equal to 28 wt % $Al_2O_3$; greater than or equal to 0 wt % and less than or equal to 5 wt % $B_2O_3$; greater than or equal to 8 wt % and less than or equal to 13 wt % $Na_2O$; greater than or equal to 0 wt % and less than or equal to 0.2 wt % $K_2O$; greater than or equal to 0 wt % and less than or equal to 4 wt % $Li_2O$; and greater than or equal to 0 wt % and less than or equal to 1.5 wt % MgO.

An nineteenth aspect A19 includes the article according to any one of the first through seventeenth aspects A1-A17, wherein the aluminosilicate glass comprises: greater than or equal to 52 wt % and less than or equal to 62 wt % $SiO_2$; greater than or equal to 16 wt % and less than or equal to 28 wt % $Al_2O_3$; greater than or equal to 0 wt % and less than or equal to 5 wt % $B_2O_3$; greater than or equal to 8 wt % and less than or equal to 13 wt % $Na_2O$; greater than or equal to 0 wt % and less than or equal to 0.2 wt % $K_2O$; greater than or equal to 0 wt % and less than or equal to 4 wt % $Li_2O$; and greater than or equal to 0 wt % and less than or equal to 1.5 wt % MgO.

A twentieth aspect A20 includes the article according to any one of the first through nineteenth aspects A1-A19, wherein the textured glass article is an electronic device back cover.

According to a twenty-first aspect A21, a method of forming a glass article may comprise: contacting an aluminosilicate glass article with an etchant, wherein the aluminosilicate glass article comprises greater than or equal to 16 wt % $Al_2O_3$ and has at least one surface and the etchant comprises a pH less than or equal to 2.2; washing the aluminosilicate glass article; and drying the aluminosilicate glass article to form the textured glass article, the textured glass article comprising a plurality of polyhedral surface features extending from a first surface of the textured glass article, each of the plurality of polyhedral surface features comprising a base on the first surface, a plurality of facets extending from the first surface, and a surface feature size at the base greater than or equal to 10 μm and less than or equal to 350 μm, wherein the plurality of facets of each polyhedral surface feature converge toward one another.

A twenty-second aspect A22 includes the method according to the twenty-first aspect A21, wherein the etchant has a pH less than or equal to 1.9.

A twenty-third aspect A23 includes the method according to the twenty-first aspect A21 or the twenty-second aspect A22, wherein the etchant comprises: greater than or equal to 5 wt % and less than or equal to 60 wt % of a salt; and greater than or equal to 2 wt % and less than or equal to 20 wt % of an acid.

A twenty-fourth aspect A24 includes the article according to the twenty-third aspect A23, wherein the salt comprises ammonium chloride, ammonium bifluoride, potassium sulfate, potassium chloride, or combinations thereof.

A twenty-fifth aspect A25 includes the article according to the twenty-third aspect A23 or the twenty-fourth aspect A24, wherein the acid comprises hydrochloric acid, hydrofluoric acid, or combinations thereof.

A twenty-sixth aspect A26 includes the article according to any one of the twenty-first through twenty-fifth aspects A20-A25, wherein contacting the aluminosilicate glass article with the etchant generates a greater amount of silicon-based precipitate than aluminum-based precipitate.

A twenty-seventh aspect A27 includes the article according to any one of the twenty-first through twenty-sixth aspects A21-A26, wherein the etchant comprises: greater than or equal to 25 wt % and less than or equal to 45 wt % ammonium chloride; greater than or equal to 5 wt % and less than or equal to 15 wt % hydrofluoric acid; and greater than or equal to 40 wt % and less than or equal to 60 wt % water.

A twenty-eighth aspect A28 includes the article according to any one of the twenty-first through twenty-sixth aspects A21-A26, wherein the etchant comprises: greater than or equal to 25 wt % and less than or equal to 45 wt % ammonium chloride; greater than or equal to 5 wt % and less than or equal to 15 wt % ammonium bifluoride; greater than or equal to 5 wt % and less than or equal to 15 wt % hydrofluoric acid; and greater than or equal to 40 wt % and less than or equal to 60 wt % water.

A twenty-ninth aspect A29 includes the article according to any one of the twenty-first through twenty-sixth aspects A21-A26, greater than or equal to 25 wt % and less than or equal to 45 wt % ammonium bifluoride; greater than or equal to 10 wt % and less than or equal to 20 wt % hydrochloric acid; and greater than or equal to 40 wt % and less than or equal to 60 wt % water.

A thirtieth aspect A30 includes the article according to any one of the twenty-first through twenty-sixth aspects A21-A26, wherein the etchant comprises: greater than or equal to 10 wt % and less than or equal to 20 wt % potassium sulfate; greater than or equal to 5 wt % and less than or equal to 15 wt % hydrofluoric acid; and greater than or equal to 5 vol % and less than or equal to 15 vol % hydrochloric acid.

A thirty-first aspect A31 includes the article according to any one of the twenty-first through twenty-sixth aspects A21-A26, wherein the etchant comprises: greater than or equal to 25 wt % and less than or equal to 45 wt % potassium chloride; greater than or equal to 5 wt % and less than or equal to 15 wt % hydrofluoric acid; and greater than or equal to 5 vol % and less than or equal to 15 vol % hydrochloric acid.

A thirty-second aspect A32 includes a consumer electronic device comprising: a housing having a front surface, a back surface, and side surfaces; electrical components provided at least partially within the housing, the electrical components including at least a controller, a memory, and a display, the display being provided at or adjacent the front surface of the housing; and the glass-ceramic article according to the first aspect A1 disposed over the display.

Additional features and advantages of the textured glass articles described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
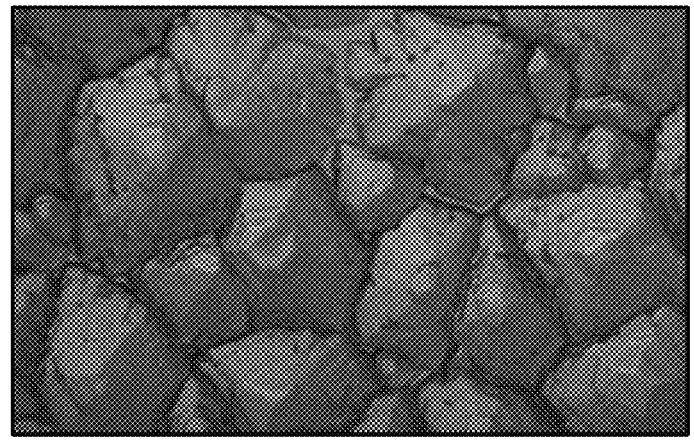
FIG. 1 is an optical microscope image of a conventional glass article formed via an etching process.

Reference will now be made in detail to various embodiments of textured glass articles having an enhanced tactile impression and a highly reflective appearance. According to embodiments, a textured glass article includes: a body comprising an aluminosilicate glass comprising greater than or equal to 16 wt % $Al_2O_3$, the body having at least a first surface; and a plurality of polyhedral surface features extending from the first surface, each of the plurality of polyhedral surface features comprising a base on the first surface, a plurality of facets extending from the first surface, and a surface feature size at the base greater than or equal to 10 μm and less than or equal to 350 μm, wherein the plurality of facets of each polyhedral surface feature converge toward one another. Various embodiments of textured glass articles and methods of making the same will be described herein with specific reference to the appended drawings.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

In the embodiments of the glass compositions described herein, the concentrations of constituent components (e.g., $SiO_2$, $Al_2O_3$, and the like) are specified in weight percent (wt %) on an oxide basis, unless otherwise specified.

X-ray diffraction (XRD) spectrum, as described herein, is measured with a D8 ENDEAVOR X-ray Diffraction system with a LYNXEYE XE-T detector manufactured by Bruker Corporation (Billerica, MA).

Optical microscope images, as described herein, are obtained using Nikon Eclipse L200N optical microscope with 20× or 50× objectives and multiple 10× from eyepiece for a total magnification of 200× or 500×.

"Surface feature size," as described herein, is measured using optical microscopy at 200× magnification. Images are obtained of two different 500 μm×1000 μm scanned areas. In each image, the maximum distance across the cross section of the base of the 10 largest surface features is measured. "Surface feature size" refers to the average maximum distance across the cross section of the base of the 20 surface features from the two scanned areas. For example, for surface features with a triangular base, the maximum distance across the cross section of the base is the height of the triangular base. For surface features with a rectangular base, the maximum distance across the cross section of the base is the diagonal measurement across the base. For surface features with a hexagonal base, the maximum distance across the cross section of the base in the largest measurement between opposed vertices.

"Surface feature height," as described herein, refers to the distance between the base of the surface feature and the topmost apex of the surface feature.

"Facet angle," as described herein, refers to the angle between a plane normal to a first surface of the aluminosilicate glass article and the facet. The facet angle is measured by arctan (height/half length) of the surface feature.

"Transmittance haze," as described herein, refers to the ratio of transmitted light scattered at an angle greater than 2.5° from normal to all transmitted light over the total transmission. Transmittance haze, as described herein, is measured in accordance with ASTM D1003 with a standard CIE-C illuminant with a wavelength range of 380 nm to 720 nm at a thickness of 0.8 mm, unless otherwise indicated.

"Surface roughness ('Ra')," as described herein, refers to the surface texture of a textured glass article quantified by the arithmetic average of the absolute values of the profile height deviations from the mean line, recorded within the evaluation length, as measured by a Mitutoyo SJ-310 surface roughness meter and in accordance with ISO 1997. Values reported herein are reported in microns, or μm, unless otherwise expressly stated.

Surface structure data, as described herein, was collected with a white light interferometer (Contour GT-X, Bruker Corporation, Billerica, MA, USA). A 50× objective and 0.55× zoom lens with green light was used to collect the data. Vertical scanning interferometry was used with the "VXI" option to record phase data as well to be used when calculating the location of the each surface point. Four areas were collected: 175 μm×235 μm (no stitching), 500 μm×500 μm (stitched), 1 mm×1 mm (stitched), and 2 mm×2 mm (stitched). MountainsMap 8 (Digital Surf, Besancon, France) was used to generate images, such as those in FIGS. 31-40. The images were used to calculate the mean surface roughness, mean root mean square height, mean developed interfacial area, fastest decay autocorrelation length, and mean peak curvature of the textured glass articles described herein, such as the resultant textured glass articles shown in Table 9. The data was leveled using a planar form remove and a smoothing function was used to fill any non-measured pixels (<1% of the data). The surface summary metrics were calculated on the primary surface after the form was removed. No further filtering or data processing was done.

"Mean surface roughness (mean Sa')," as described herein and calculated using MountainsMap 8, refers to the arithmetical mean height across the four areas collected by the white light interferometer as measured in accordance with ISO 25178.

"Mean root mean square height (mean Sq')," as described herein and calculated using MountainsMap 8, refers to the standard deviation of heights across the four areas collected by the white light interferometer as measured in accordance with ISO 25178.

"Mean developed interfacial area (mean Sdr')," as described herein and calculated using MountainsMap 8, refers to the percentage of additional surface area contributed by the texture as compared to the planar definition area across the four areas collected by the white light interferometer as measured in accordance with ISO 25178.

"Fastest decay autocorrelation length (' Sal')," as described herein and calculated using MountainsMap 8, refers to the horizontal distance in the direction in which the auto-correlation function decays to the value(s) (i.e. 0.2 default) the fastest across the 2 mm×2 mm (stitched) area collected by the white light interferometer as measured in accordance with ISO 25178.

"Mean peak curvature ('Spc')," as described herein and calculated using MountainsMap 8, refers to the arithmetic mean of the principal curvature of the peaks on the surface across the 2 mm×2 mm (stitched) area collected by the white light interferometer as measured in accordance with ISO 25178.

The microscopic images, as shown herein, were obtained

Grayscale distributions, as described herein, were collected by illuminating an article with a high intensity white LED (Metaphaser LED Light Engine, Metaphase Technologies, Bristol, PA, USA) coupled to a fiber optic light guide. Light reflected off of the surface of the article was collected by a camera/lens combination (Stingray F-125B, Allied Vision Technologies Gmbh, Stadtroda, Germany and M112FM50, Tamron Co., Ltd., Saitama, Japan). The lens aperture was f/2.8, the working distance was approximately 300 mm, the exposure time was 6 ms, and the gain was set to 0 db. The images collected were used to calculate the location of peak maximum, full width at half maximum, range of location of peak maximum values, skewness, and excess kurtosis of the textured glass articles described herein, such as the resultant textured glass articles shown in Table 9.

"GU," as described herein, refers to a grayscale unit.

"Location of peak maximum ('peak GU')," as described herein and calculated from images collected by reflecting light off the surface of the article, refers to the grayscale value where the amplitude is maximized.

"Full width at half maximum ('FWHM')," as described herein and calculated from images collected by reflecting light off the surface of the article, refers to the width of a curve measured between those points on the y-axis which are half the maximum amplitude.

"Range of GU values," as described herein and calculated from images collected by reflecting light off the surface of the article, refers to the difference between the highest grayscale value and the lowest grayscale value in a given image.

"Skewness," as described herein and calculated from images collected by reflecting light off the surface of the article, refers to the asymmetry of a distribution of a real-values random variable about its mean. For reference, a normal distribution has a skewness equal to zero.

"Excess kurtosis," as described herein, refers to the kurtosis minus 3 and is used as a direct comparison to the standard normal distribution kurtosis.

Bi-directional reflectance distribution (BRDF), as described herein, was measured using a Reflet 180S goniometer or a Complete Angle Scatter Instrument (CASI) from Scatter Works, as specified below. The Reflet 180S measures BRDF at a dynamic range up to $10^9$ enabling inspection of specular and diffused surfaces. In the Reflet 180S, a collimated beam of halogen light was used as the light source and cosine correction to BRDF signal was applied by calibrating the Reflet system using known diffuse reflectance standard. The CASI system makes high resolution angular measurements using a variable detector aperture and a coherent laser source. The system measures the BRDF spectrum at a dynamic range of up to $10^{13}$ and is able to detect detailed features within the angular spectrum.

"Polyhedral," when used to describe the structure of a surface feature on a textured glass article, refers to a three-dimensional shape with flat polygonal faces, straight edges, and a surface feature size at the base greater than or equal to 10 μm.

"Dendritic," when used to describe the structure of a surface feature on a textured glass article, refers to a branching structure having a surface feature size at the base less than 10 μm.

Figure 2:
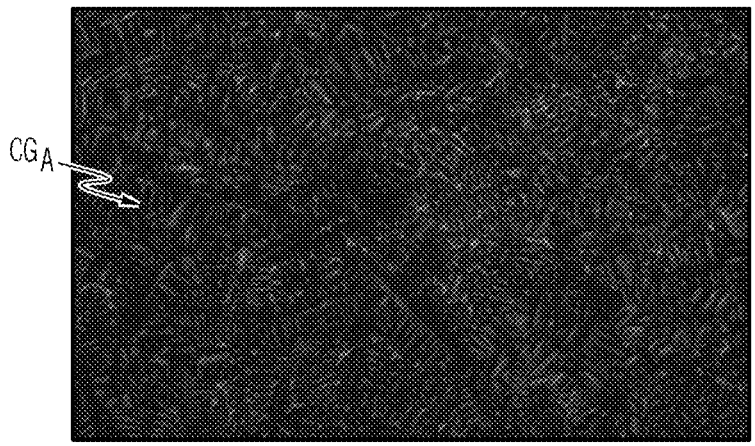
FIG. 2 is an optical microscope image of a conventional glass article formed via an etching process.
Figure 3:
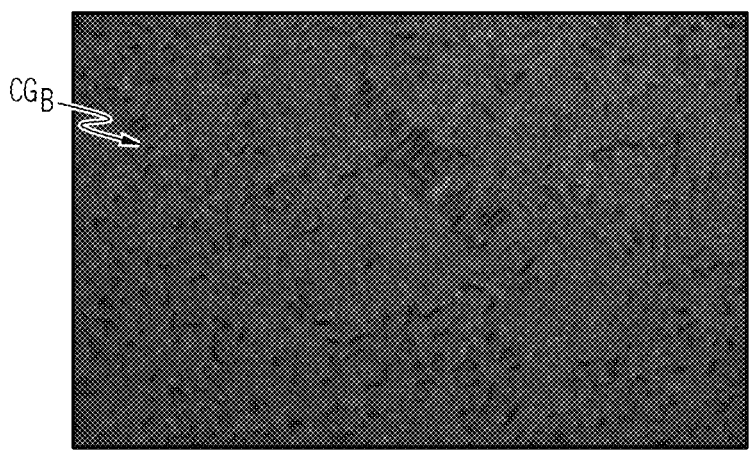
FIG. 3 is an optical microscope image of a conventional glass article formed via an etching process.

Etchants have been used to achieve textured surfaces on glass articles. For example, referring now to FIG. 1, optical microscope images of three glass articles treated with an ammonium etchant are shown. The ammonium etchant used had a pH of 3.5 (i.e., pH higher than 2.2) and included 6 wt % hydrofluoric acid, 15 wt % ammonium bifluoride, and 10 vol % propylene glycol. When a soda-lime-silicate glass article such as that shown in FIG. 1A is treated with the described ammonium etchant, the etchant precipitate primarily consists of metal fluorosilicate ($MSiF_6$), which results in large (i.e., greater than or equal to 10 μm), polyhedral surface features that provide an enhanced tactile impression and a "glowing" (i.e., highly reflective) appearance. However, when aluminosilicate glass articles comprising greater than 16 wt % $Al_2O_3$, such as those shown in FIGS. 2 and 3, are treated with the described ammonium etchant, the etchant precipitate primarily consists of metal aluminofluoride ($MAlF_5$), which results in small (i.e., less than 10 μm), dendritic surface features. These dendritic surface features do not provide a significant tactile impression. Moreover, while dendritic surface features may include flat faces, these flat faces may be relatively small, which attenuates the reflectivity of the resulting glass article.

Disclosed herein are textured glass articles and texturing methods which mitigate the aforementioned problems such that aluminosilicate glasses comprising greater than or equal to 16 wt % $Al_2O_3$ (which exhibit superior ion-exchangeability and drop performance) may be treated to produce the desired texture and appearance. Specifically, textured glass articles disclosed herein comprise an aluminosilicate glass having large, polyhedral surface features that provide an enhanced tactile impression and a highly reflective appearance. To produce the desired textured surface on an aluminosilicate glass article comprising greater than or equal to 16 wt % $Al_2O_3$, the etchant should preferentially generate a silicon-based precipitate, which leads to large, polyhedral surface features, and minimize the aluminum-based precipitate, which leads to small, dendritic surface features. Because an aluminum-based precipitate has higher solubility at lower pH (e.g., less than or equal to 2.2), etchants with a lower pH are capable of forming more silicon-based crystal seeds than aluminum-based crystal seeds, which results in the desired textured surface. Accordingly, the etchants described herein have a pH less than or equal to 2.2.

Figure 4:
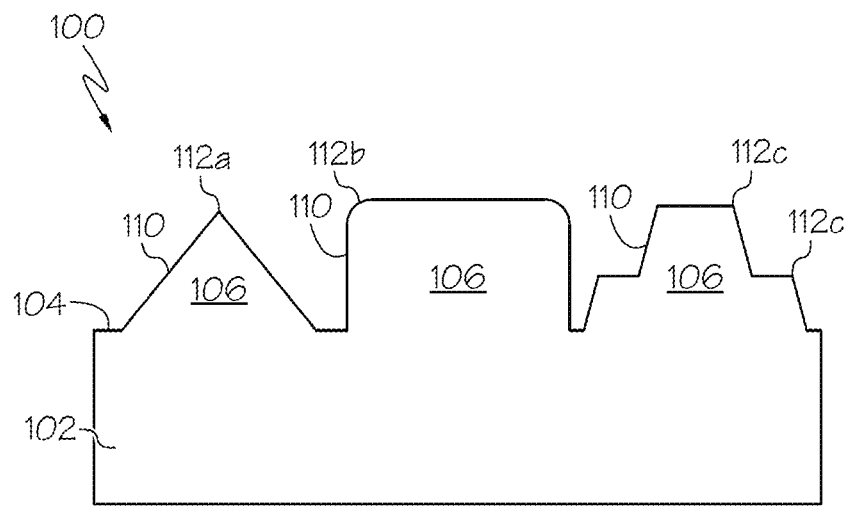
FIG. 4 schematically depicts a perspective view of a textured glass article, according to one or more embodiments shown and described herein.
Figure 5:
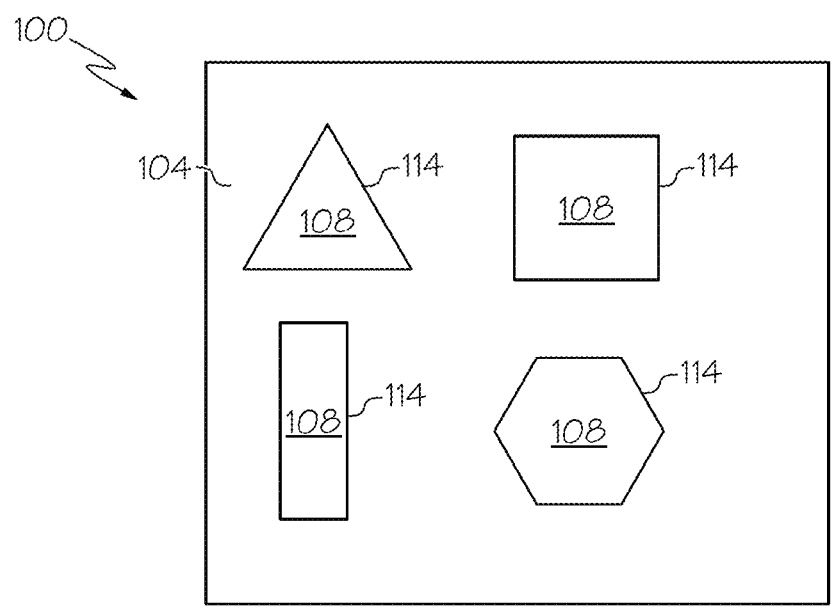
FIG. 5 schematically depicts a plan view, respectively, of a textured glass article, according to one or more embodiments shown and described herein.

Referring now to FIGS. 4 and 5, the textured glass articles 100 described herein have a body 102 including an aluminosilicate glass comprising greater than or equal to 16 wt % $Al_2O_3$. In embodiments, the aluminosilicate glass may comprise greater than or equal to 52 wt % and less than or equal to 62 wt % $SiO_2$, greater than or equal to 16 wt % and less than or equal to 28 wt % $Al_2O_3$, greater than or equal to 0 wt % and less than or equal to 5 wt % $B_2O_3$, greater than or equal to 8 wt % and less than or equal to 13 wt % $Na_2O$, greater than or equal to 0 wt % and less than or equal to 0.2 wt % $K_2O$, greater than or equal to 0 wt % and less than or equal to 4 wt % $Li_2O$, and greater than or equal to 0 wt % and less than or equal to 1.5 wt % MgO. In embodiments, the aluminosilicate glass may comprise greater than or equal to 52 wt % and less than or equal to 67 wt % $SiO_2$, greater than or equal to 16 wt % and less than or equal to 28 wt % $Al_2O_3$, greater than or equal to 0 wt % and less than or equal to 5 wt % $B_2O_3$, greater than or equal to 8 wt % and less than or equal to 15 wt % $Na_2O$, greater than or equal to 0 wt % and less than or equal to 0.2 wt % $K_2O$, greater than or equal to 0 wt % and less than or equal to 4 wt % $Li_2O$, and greater than or equal to 0 wt % and less than or equal to 5 wt % MgO. However, it should be understood that other aluminosilicate glasses are contemplated and possible, so long as the aluminosilicate glass has greater than or equal to 16 wt % $Al_2O_3$.

The body 102 includes at least a first surface 104. A plurality of polyhedral surface features 106 extend from the first surface 104. Each polyhedral surface feature 106 includes a base 108 on the first surface 104 and a plurality of facets 110 extending from the first surface 104.

In embodiments, the facets 110 of each polyhedral surface feature 106 extend from the first surface 104 and converge toward one another to form the polyhedral morphology (e.g., pyramidal with 3-fold symmetry, 4-fold symmetry, 6-fold symmetry, etc.) of the polyhedral surface features 106. In embodiments, the facets 110 of each polyhedral surface feature 106 converge toward each other at a facet angle greater than or equal to 0.5° and less than or equal to 12°. In embodiments, the facets 110 may be triangular, rectangular, or trapezium. In embodiments, the facets 110 converge to form at least one apex 112a, 112b, 112c. In embodiments, the apex may be a sharp apex 112a, a rounded apex 112b, or a truncated apex 112c.

The base 108 of each polyhedral surface feature 106 comprises at least three sides 114. At least one side 114 of the base 108 converges toward at least another side 114. In embodiments, the base 108 may be triangular, rectangular, or hexagonal. In embodiments, a surface feature size at the base 108 is greater than or equal to 10 μm and less than or equal to 350 μm. In embodiments, the surface feature size at the base 108 is greater than or equal to 10 μm, greater than or equal to 20 μm, or even greater than or equal to 50 μm. In embodiments, the surface feature size at the base 108 is less than or equal to 350 μm, less than or equal to 300 μm, less than or equal to 250 μm, or even less than or equal to 200 μm. In embodiments, the surface feature size at the base 108 is greater than or equal to 10 μm and less than or equal to 350 μm, greater than or equal to 10 μm and less than or equal to 300 μm, greater than or equal to 10 μm and less than or equal to 250 μm, greater than or equal to 20 μm and less than or equal to 350 μm, greater than or equal to 20 μm and less than or equal to 300 μm, greater than or equal to 20 μm and less than or equal to 250 μm, greater than or equal to 50 μm and less than or equal to 350 μm, greater than or equal to 50 μm and less than or equal to 300 μm, or even greater than or equal to 50 μm and less than or equal to 250 μm, or any and all sub-ranges formed from any of these endpoints. The structure of each polyhedral surface feature 106 aids in achieving the desired enhanced tactile impression.

In embodiments, the textured glass article 100 may have a surface roughness Ra greater than or equal to 2 μm or even greater than or equal to 4 μm. In embodiments, the textured glass article 100 may have a surface roughness Ra less than or equal to 12 μm or even less than or equal to 10 μm. In embodiments, the textured glass article may have a surface roughness Ra greater than or equal to 2 μm and less than or equal to 12 μm, greater than or equal to 2 μm and less than or equal to 10 μm, greater than or equal to 4 μm and less than or equal to 12 μm, or even greater than or equal to 4 μm and less than or equal to 10 μm, or any and all sub-ranges formed from any of these endpoints.

In embodiments, the textured glass article 100 including a plurality of polyhedral surface features 106 may have a relatively rough surface, as indicated by a relatively higher mean Sa, as compared to a textured glass article that lacks polyhedral surface features. In embodiments, the textured glass article 100 including a plurality of polyhedral surface features 106 may have a relatively wider distribution of surface feature height, as indicated by a relatively higher mean Sq, as compared to a textured glass article that lacks polyhedral surface features.

In embodiments, the textured glass article 100 may have a mean Sa greater than or equal to 0.75 μm or even greater than or equal to 1 μm. In embodiments, the textured glass article 100 may have a mean Sa less than or equal to 10 μm or even less than or equal to 5 μm. In embodiments, the textured glass article 100 may have a mean Sa greater than or equal to 0.75 μm and less than or equal to 10 μm, greater than or equal to 0.75 μm and less than or equal to 5 μm, greater than or equal to 1 μm and less than or equal to 10 μm, or even greater than or equal to 1 μm and less than or equal to 5 μm, or any and all sub-ranges formed from any of these endpoints.

In embodiments, the textured glass article 100 may have a mean Sq greater than or equal to 1 μm or even greater than or equal to 1.25 μm. In embodiments, the textured glass article 100 may have a mean Sq less than or equal to 2 μm or even less than or equal to 1.5 μm. In embodiments, the textured glass article 100 may have a mean Sq greater than or equal to 1 μm and less than or equal to 2 μm, greater than or equal to 1 μm and less than or equal to 1.5 μm, greater than or equal to 1.25 μm and less than or equal to 2 μm, or even greater than or equal to 1.25 μm and less than or equal to 1.5 μm, or any and all sub-ranges formed from any of these endpoints.

In embodiments, the textured glass article 100 including a plurality of surface features 106 may have a relatively greater angled surface area and a larger distance between surface features, as indicated by a relatively higher mean Sdr and relatively higher Sal, as compared to a textured glass article that lacks polyhedral surface features.

In embodiments, the textured glass article 100 may have a mean Sdr greater than or equal to 7%, greater than or equal to 10%, or even greater than or equal to 15%. In embodiments, the textured glass article 100 may have a mean Sdr less than or equal to 25% or even less than or equal to 20%. In embodiments, the textured glass article 100 may have a mean Sdr greater than or equal to 7% and less than or equal to 25%, greater than or equal to 7% and less than or equal to 20%, greater than or equal to 10% and less than or equal to 25%, greater than or equal to 10% and less than or equal to 20%, greater than or equal to 15% and less than or equal to 25%, or even greater than or equal to 15% and less than or equal to 20%, or any and all sub-ranges formed from any of these endpoints.

In embodiments, the textured glass article 100 may have a Sal greater than or equal to 0.020 mm or even greater than or equal to 0.025 mm. In embodiments, the textured glass article 100 may have a Sal less than or equal to 0.1 mm or even less than or equal to 0.09 mm. In embodiments, the textured glass article 100 may have a Sal greater than or equal to 0.020 mm and less than or equal to 0.1 mm, greater than or equal to 0.020 mm and less than or equal to 0.09 mm, greater than or equal to 0.025 mm and less than or equal to 0.1 mm, or even greater than or equal to 0.025 mm and less than or equal to 0.09 mm, or any and all sub-ranges and formed from any of these endpoints.

In embodiments, the textured glass article 100 including a plurality of polyhedral surface features 106 may have a relatively higher amount of points of contact with other objects due to the presence of pointed shapes, as indicated by a relatively higher Spc, as compared to a textured glass article that lacks polyhedral surface features. A relatively lower Spc value indicates that the points of contact between features on the surface have more rounded shapes. In embodiments, the textured glass article 100 may have a Spc greater than or equal to 8000 $mm^{-1}$ or even greater than or equal to 10000 $mm^{-1}$. In embodiments, the textured glass article 100 may have a Spc less than or equal to 17000 $mm^{-1}$ or even less than or equal to 15000 $mm^{-1}$. In embodiments, the textured glass article 100 may have a Spc greater than or equal to 8000 $mm^{-1}$ and less than or equal to 17000 $mm^{-1}$, greater than or equal to 8000 $mm^{-1}$ and less than or equal to 15000 $mm^{-1}$, greater than or equal to 10000 $mm^{-1}$ and less than or equal to 17000 $mm^{-1}$, or even greater than or equal to 10000 $mm^{-1}$ and less than or equal to 15000 $mm^{-1}$, or any and all sub-ranges formed from any of these endpoints.

In embodiments, each of the plurality of polyhedral surface features 106 may comprise a dendritic structure extending from the base 108 of the polyhedral surface feature 106. As described above with reference to FIGS. 2 and 3, dendritic features alone may not provide significant tactile impression or high reflectively. However, when formed in combination with the polyhedral surface features 106, the desired textured surface may be achieved.

The structure of each polyhedral surface feature 106, which includes flat, converging facets 110 and are approximately straight along the relatively large bases 108, reflects light in different directions to achieve the "glowing" (i.e., highly reflective) appearance. The "glowing" appearance of the textured glass article may be evidenced by a relatively greater peak GU, FWHM, range of GU values, skewness, and excess kurtosis as compared to a textured glass article that lacks polyhedral surface features.

A relatively higher peak GU within the GU distribution corresponds to more light being reflected from the flat, converging facets 110 of the polyhedral surface features 106. In embodiments, the textured glass article 100 may have a peak GU greater than or equal to 50 GU, greater than or equal to 60 GU, greater than or equal to 70 GU or even greater than or equal to 80 GU. In embodiments, the textured glass article 100 GU may have a peak GU less than or equal to 150 GU, less than or equal to 125 GU, less than or equal to 115 GU or even less than or equal to 100 GU. In embodiments, the textured glass article may have a peak GU greater than or equal to 50 GU and less than or equal to 150 GU, greater than or equal to 50 GU and less than or equal to 125 GU, greater than greater than or equal to 50 GU and less than or equal to 115 GU, greater than or equal to 50 GU and less than or equal to 100 GU, greater than or equal to 60 GU and less than or equal to 150 GU, greater than or equal to 60 GU and less than or equal to 125 GU, greater than greater than or equal to 60 GU and less than or equal to 115 GU, greater than or equal to 60 GU and less than or equal to 100 GU, greater than or equal to 70 GU and less than or equal to 150 GU, greater than or equal to 70 GU and less than or equal to 125 GU, greater than greater than or equal to 70 GU and less than or equal to 115 GU, greater than or equal to 70 GU and less than or equal to 100 GU, greater than or equal to 80 GU and less than or equal to 150 GU, greater than or equal to 80 GU and less than or equal to 125 GU, greater than greater than or equal to 80 GU and less than or equal to 115 GU, greater than or equal to 80 GU and less than or equal to 100 GU, or any and all sub-ranges formed from any of these endpoints.

A relatively greater FWHM and range of GU values correspond to a wider distribution of grayscale values, which increase with surface feature size.

In embodiments, the textured glass article 100 may have a FWHM greater than or equal to 20 GU or even greater than or equal to 25 GU. In embodiments, the textured glass article 100 may have a FWHM less than or equal to 40 GU or even less than or equal to 30 GU. In embodiments, the textured glass article 100 may have a FWHM greater than or equal to 20 GU and less than or equal to 40 GU, greater than or equal to 20 GU and less than or equal to 30 GU, greater than or equal to 25 GU and less than or equal to 40 GU, or even greater than or equal to 25 GU and less than or equal to 30 GU, or any and all sub-ranges formed from any of these endpoints.

In embodiments, the textured glass article 100 may have a range of GU values greater than or equal to 100 GU or even greater than or equal to 125 GU. In embodiments, the textured glass article 100 may have a range of GU values less than or equal to 250 GU or even less than or equal to 225 GU. In embodiments, the textured glass article 100 may have a range of GU values greater than or equal to 100 GU and less than or equal to 250 GU, greater than or equal to 100 GU and less than or equal to 225 GU, greater than or equal to 125 GU and less than or equal to 250 GU, or even greater than or equal to 125 GU and less than or equal to 225 GU, or any and all sub-ranges formed from any of these endpoints.

Skewness describes the asymmetry of a grayscale distribution. A relatively greater skewness corresponds to greater positive ("right-handed") asymmetry about the mean grayscale value, which is indicative of a greater amount of high intensity contributions (e.g., outside upper limit of 75% interquartile range) to the distribution of light reflected from the flat, converging facets 110 of the polyhedral surface features 106. In embodiments, the textured glass article may have a skewness greater than or equal to 0.25 or even greater than or equal to 0.5. In embodiments, the textured glass article 100 may have a skewness less than or equal to 0.9 or even less than or equal to 0.75. In embodiments, the textured glass article 100 may have a skewness greater than or equal to 0.25 and less than or equal to 0.9, greater than or equal to 0.25 and less than or equal to 0.75, greater than or equal to 0.5 and less than or equal to 0.9, or even greater than or equal to 0.5 and less than or equal to 0.75, or any and all sub-ranges formed from any of these endpoints.

Kurtosis provides a measure of the outliers in a grayscale distribution. The more "heavy-tailed" a distribution is, the more outliers are present. Excess kurtosis, which is the kurtosis minus three, is used to make the comparison to a normal distribution easier since the kurtosis of an ideal normal distribution is three. By subtracting three, the kurtosis of an idealized normal distribution is thus shifted to zero and any additional kurtosis in the sample distribution is referred to as excess kurtosis. A relatively greater excess kurtosis indicates that there is a significant amount of high intensity grayscale value outliers (e.g., outside upper limit of 75% interquartile range), corresponding to a greater amount of high intensity contributions to the distribution of light reflected from the flat, converging facets 110 of the polyhedral surface features 106. In embodiments, the textured glass article 100 may have an excess kurtosis greater than or equal to 0.5 or even greater than or equal to 1. In embodiments, the textured glass article 100 may have an excess kurtosis less than or equal to 3 or even less than or equal to 2.5. In embodiments, the textured glass article 100 may have an excess kurtosis greater than or equal to 0.5 and less than or equal to 3, greater than or equal to 0.5 and less than or equal to 2.5, greater than or equal to 1 and less than or equal to 3, or even greater than or equal to 1 and less than or equal to 2.5, or any and all sub-ranges formed from any of these endpoints.

Multiple scatter peaks in a BRDF spectrum indicate the reflection of light from the flat, converging facets 110 of the polyhedral surface features 106. In embodiments, the textured glass article 100 may produce a BRDF spectrum including at least one peak appearing at least 1°, at least 5°, or even at least 10° away from the angle of incidence.

The transmittance haze of the textured glass article 100 may be analyzed for manufacturing quality control. In embodiments, the textured glass article 100 may have a transmittance haze greater than or equal to 40%, greater than or equal to 50%, or even greater than or equal to 60%. In embodiments, the textured glass article 100 may have a transmittance haze less than or equal to 95% or even less than or equal to 90%. In embodiments, the textured glass article 100 may have a transmittance haze greater than or equal to 40% and less than or equal to 95%, greater than or equal to 40% and less than or equal to 90%, greater than or equal to 50% and less than or equal to 95%, greater than or equal to 50% and less than or equal to 90%, greater than or equal to 60% and less than or equal to 95%, or even greater than or equal to 60% and less than or equal to 90%, or any and all sub-ranges formed from any of these endpoints.

Figure 6:
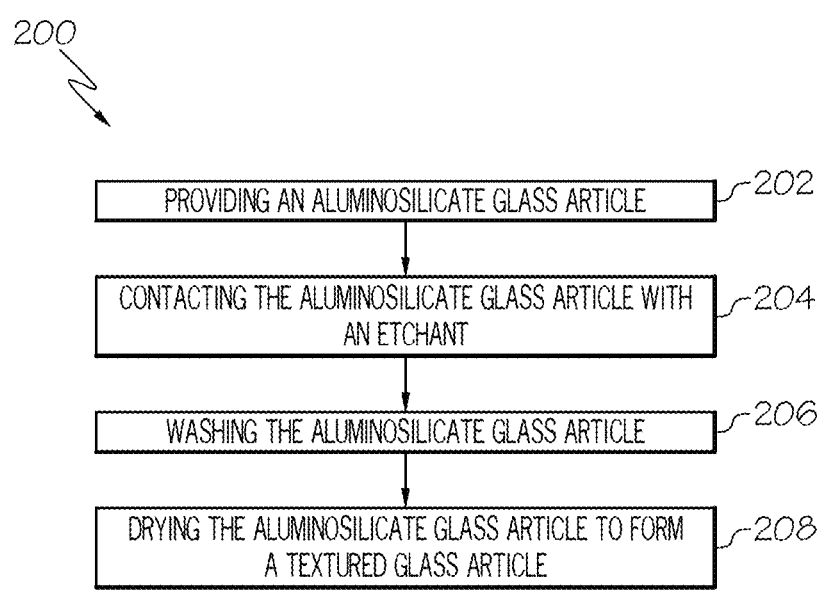
FIG. 6 is a flow diagram of method of forming a textured glass article according to one or more embodiments described herein.
Figure 7:
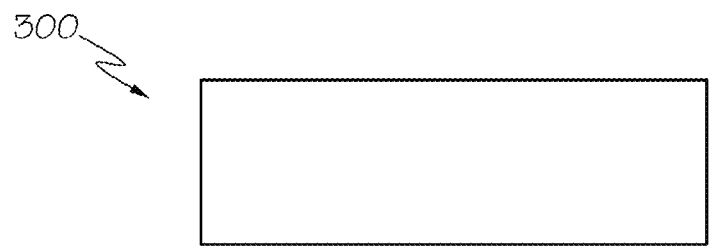
FIG. 7 schematically depicts a step of an etching process, according to one or more embodiments shown and described herein.

Referring now to FIG. 6, a method of forming a textured glass article comprising the plurality of polyhedral surface features by a chemical etching process is shown at 200. At block 202 and as shown in FIG. 7, an aluminosilicate glass article 300 comprising greater than or equal to 16 wt % $Al_2O_3$ is initially provided. The aluminosilicate glass article 300 may be in the form of a plate with a first surface and a second surface opposite and generally parallel to the first surface. In embodiments, the aluminosilicate glass article 300 may be pre-cleaned with a cleaning solution including hydrofluoric acid, hydrochloric acid, or combinations thereof. In embodiments, the amount of hydrofluoric acid in the cleaning solution may be greater than or equal to 2.5 wt % and less than or equal to 10%. In embodiments, the amount of hydrochloric acid in the cleaning solution may be greater than or equal to 2 wt % and less than or equal to 10 wt %. In embodiments, the concentration of hydrofluoric acid in the cleaning solution may be greater than or equal to 1.5 M and less than or equal to 6 M. In embodiments, the concentration of hydrochloric acid in the cleaning solution may be greater than or equal to 0.6 M and less than or equal to 3 M.

Figure 8:
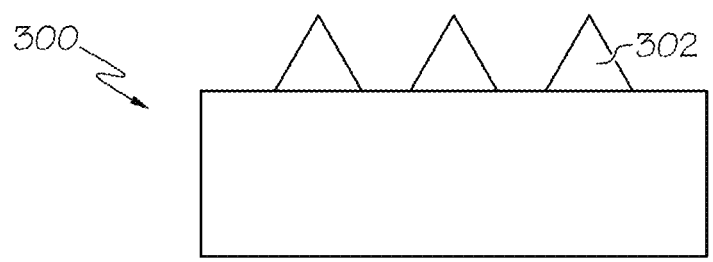
FIG. 8 schematically depicts another step of the etching process, according to one or more embodiments shown and described herein.

Referring back to FIG. 6 at block 204 and as shown in FIG. 8, the aluminosilicate glass article 300 is contacted with an etchant. The etchant reacts with the aluminosilicate glass article 300, which causes silicate and/or aluminate species to be released from aluminosilicate glass article 300. The silicate and/or aluminate species combine with elements of the etchant to produce precipitates. If these precipitates have a low solubility in the etchant, then they deposit on the surface of the aluminosilicate glass article 300 to form crystal seeds 302 (e.g., salt crusts).

Figure 9:
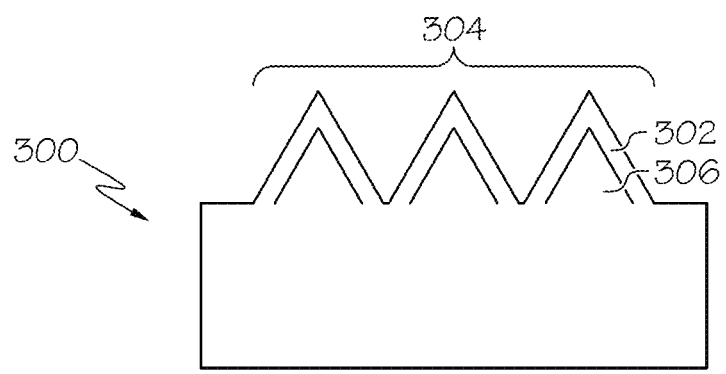
FIG. 9 schematically depicts another step of the etching process, according to one or more embodiments shown and described herein.

As shown in FIG. 9, as the etchant continues to react with the aluminosilicate glass article 300, the crystal seeds 302 grow. Because the crystal seeds 302 are insoluble in the etchant, the crystal seeds 302 serve as in-situ mask 304. The mask 304 seals portions of the surface of the aluminosilicate glass article 300. Glass is etched away around the mask 304 to generate polyhedral surface features 306. The shape of the polyhedral surface features 306 may be determined by the shape of the mask 304, which may be altered by varying the composition of the etchant and/or varying the length of time the etchant contacts the aluminosilicate glass article 200.

Figure 10:
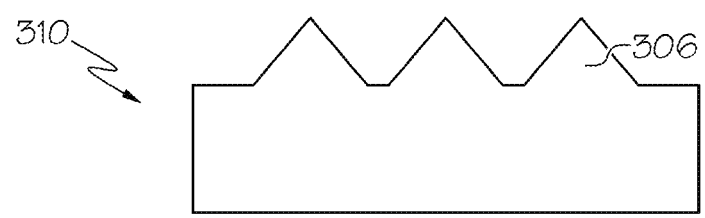
FIG. 10 schematically depicts another step of the etching process, according to one or more embodiments shown and described herein.

Referring back to FIG. 6 at block 206 and as shown in FIG. 10, the aluminosilicate glass article 300 is washed to remove the etchant and crystal seeds 302 from the surface and then dried to form the textured glass article 310 having polyhedral surface features 306. In embodiments, the etchant is rinsed off of the aluminosilicate glass article 300 with deionized (DI) water. In embodiments, crystal seeds 302 adhering to the aluminosilicate glass article 300 may be removed by, for example, a scrubber sponge. Referring back to FIG. 6 at block 208, in embodiments, the aluminosilicate glass article 300 is dried in ambient condition. Alternatively, the aluminosilicate glass article may be 300 heated to dry the glass article.

To produce the desired textured surface on an aluminosilicate glass article comprising greater than or equal to 16 wt % $Al_2O_3$, the etchants described herein are prepared such that the etchant preferentially generates a silicon-based precipitate and minimizes the amount of aluminum-based precipitate. Silicon-based precipitates (e.g., metal fluorosilicate ($MSiF_6$)) lead to large, polyhedral surface features. Aluminum-based precipitates (e.g., metal aluminofluoride ($MAlF_5$)) lead to small, dendritic surface features. Because an aluminum-based precipitate has higher solubility at lower pH (e.g., at pH values less than or equal to 2.2), etchants with a lower pH are capable of generating a greater amount of silicon-based precipitates than aluminum-based precipitates, which results in the desired textured surface.

Accordingly, the etchants described herein have a pH less than or equal to 2.2. In embodiments, the etchant may have a pH less than or equal to 2.2, less than or equal to 1.9, less than or equal to 1.6, or even less than or equal to 1.3. An etchant with a pH less than 1.3 may only produce silicon-based precipitates. Accordingly, in embodiments where the production of aluminum-based precipitates is not desired, the etchant may have a pH less than 1.3.

In embodiments, the etchant may comprise a salt and an acid, as described in further detail herein.

The salt present in the etchant acts as a crystallization promoter encouraging the formation of crystal seeds. In embodiments, the salt may comprise ammonium chloride, ammonium fluoride, ammonium bifluoride, ammonium sulfate, ammonium nitrate, potassium sulfate, potassium chloride, potassium fluoride, potassium bifluoride, potassium nitrate, sodium chloride, sodium fluoride, sodium bifluoride, or combinations. The amount of the salt in the etchant should be sufficiently high (e.g., greater than or equal to 5 wt %) to ensure the formation of the crystal seeds. The amount of salt may be limited (e.g., less than or equal to 60 wt %) to reduce or prevent undissolved salt that may precipitate out once solubility is reached. Undissolved salt may etch differently than the etchant and may cause a lack of uniformity across the textured glass surface. In embodiments, the etchant may comprise greater than or equal to 5 wt % and less than or equal to 60 wt % of the salt. In embodiments, the amount of the salt in the etchant may be greater than or equal to 5 wt %, greater than or equal to 10 wt %, or even greater than or equal to 25 wt %. In embodiments, the amount of the salt in the etchant may be less than or equal to 60 wt %, less than or equal to 50 wt %, or even less than or equal to 45 wt %. In embodiments, the amount of the salt in the etchant may be greater than or equal to 5 wt % and less than or equal to 60 wt %, greater than or equal to 5 wt % and less than or equal to 50 wt %, greater than or equal to 5 wt % and less than or equal to 45 wt %, greater than or equal to 10 wt % and less than or equal to 60 wt %, greater than or equal to 10 wt % and less than or equal to 50 wt %, greater than or equal to 10 wt % and less than or equal to 45 wt %, greater than or equal to 25 wt % and less than or equal to 60 wt %, greater than or equal to 25 wt % and less than or equal to 50 wt %, or even greater than or equal to 25 wt % and less than or equal to 45 wt %, or any and all sub-ranges formed from any of these endpoints.

The acid present in the etchant functions to dissolve the components of the glass network of the aluminosilicate glass article and form the polyhedral surface features. In embodiments, the acid may comprise hydrochloric acid, hydrofluoric acid, nitric acid, sulfuric acid, oxalic acid, acetic acid, bisulfate salt (e.g., sodium bisulfate) or combinations thereof. The amount of the acid in the etchant should be sufficiently high (e.g., greater than or equal to 2 wt %) to ensure etching of glass and the formation of the textured glass article The amount of acid may be limited (e.g., less than or equal to 20 wt %) to ensure the large, polyhedral surface features are produced. When an excessive amount of acid is added, the polyhedral surface features may be corroded to a smaller size, losing their enhanced tactile impression and highly reflective appearance. In embodiments, the etchant may comprise greater than or equal to 2 wt % and less than or equal to 20 wt % of the acid. In embodiments, the amount of the acid in the etchant may be greater than or equal to 2 wt %, greater than or equal to 5 wt %, or even greater than or equal to 10 wt %. In embodiments, the amount of the acid in the etchant may be less than or equal to 20 wt % or even less than or equal to 15 wt %. In embodiments, the amount of the acid in the etchant may be greater than or equal to 2 wt % and less than or equal to 20 wt %, greater than or equal to 2 wt % and less than or equal to 15 wt %, greater than or equal to 5 wt % and less than or equal to 20 wt %, greater than or equal to 5 wt % and less than or equal to 15 wt %, greater than or equal to 10 wt % and less than or equal to 20 wt %, or even greater than or equal to 10 wt % and less than or equal to 15 wt %, or any and all sub-ranges formed from any of these endpoints.

In embodiments, the etchant may further include a solvent. In embodiments, the solvent may comprise water, an acid (e.g., hydrochloric acid and/or hydrofluoric acid), or combinations thereof. In embodiments, the etchant may comprise greater than or equal to 40 wt % and less than or equal to 60 wt % of the solvent. In embodiments, the amount of the solvent in the etchant may be greater than or equal to 40 wt % or even greater than or equal to 45 wt %. In embodiments, the amount of the solvent in the etchant may be less than or equal to 60 wt % or even less than or equal to 55 wt %. In embodiments, the amount of the solvent in the etchant may be greater than or equal to 40 wt % and less than or equal to 60 wt %, greater than or equal to 40 wt % and less than or equal to 55 wt %, greater than or equal to 45 wt % and less than or equal to 60 wt %, or even greater than or equal to 45 wt % and less than or equal to 55 wt %, or any and all sub-ranges formed from any of these endpoints. In embodiments, the etchant may comprise greater than or equal to 5 vol % and less than or equal to 15 vol % of the solvent.

In embodiments, the etchant is prepared by mixing the components and stirring for at least 12 hours (i.e., aging). After stirring, the supernatant is decanted and used as the etchant.

In embodiments, the etchant may comprise greater than or equal to 25 wt % and less than or equal to 45 wt % ammonium chloride; greater than or equal to 5 wt % and less than or equal to 15 wt % hydrofluoric acid; and greater than or equal to 40 wt % and less than or equal to 60 wt % water.

In embodiments, the etchant may comprise greater than or equal to 25 wt % and less than or equal to 45 wt % ammonium chloride; greater than or equal to 5 wt % and less than or equal to 15 wt % ammonium bifluoride; greater than or equal to 5 wt % and less than or equal to 15 wt % hydrofluoric acid; and greater than or equal to 40 wt % and less than or equal to 60 wt % water.

In embodiments, the etchant may comprise greater than or equal to 25 wt % and less than or equal to 45 wt % ammonium bifluoride; greater than or equal to 10 wt % and less than or equal to 20 wt % hydrochloric acid; and greater than or equal to 40 wt % and less than or equal to 60 wt % water.

In embodiments, the etchant may comprise greater than or equal to 10 wt % and less than or equal to 20 wt % potassium sulfate; greater than or equal to 5 wt % and less than or equal to 15 wt % hydrofluoric acid; and greater than or equal to 5 vol % and less than or equal to 15 vol % hydrochloric acid.

In embodiments, the etchant may comprise greater than or equal to 25 wt % and less than or equal to 45 wt % potassium chloride; greater than or equal to 5 wt % and less than or equal to 15 wt % hydrofluoric acid; and greater than or equal to 5 vol % and less than or equal to 15 vol % hydrochloric acid.

Figure 11:
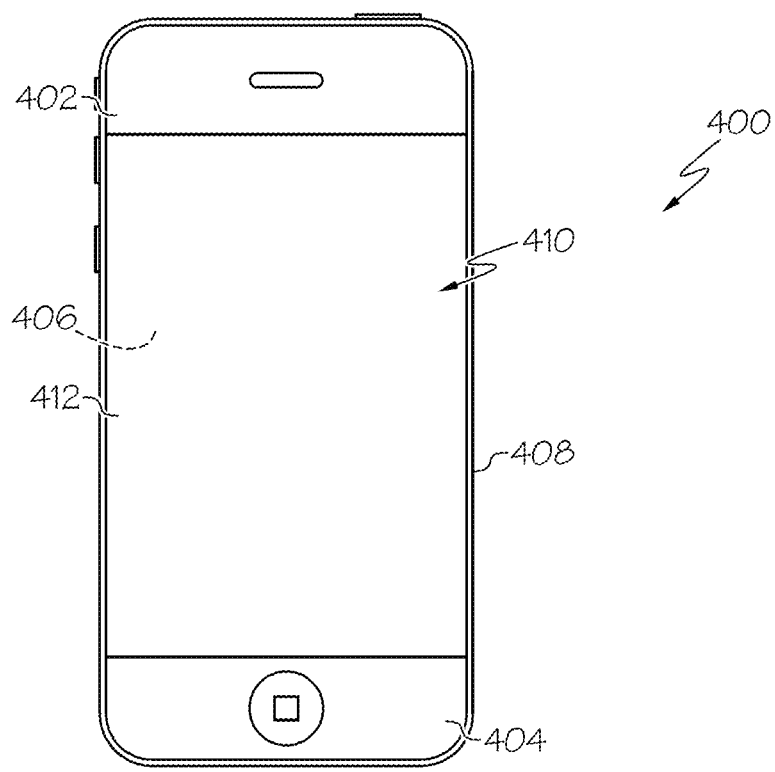
FIG. 11 is a plan view of an exemplary electronic device incorporating any of the textured glass articles, according to one or more embodiments shown and described herein.
Figure 12:
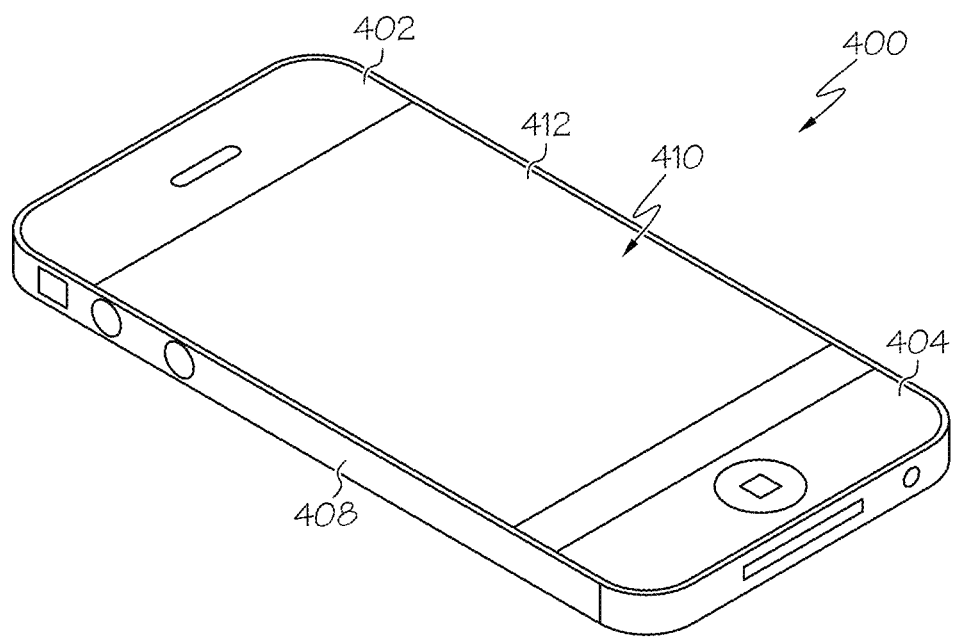
FIG. 12 is a perspective view of the exemplary electronic device of FIG. 11.
Figure 13:
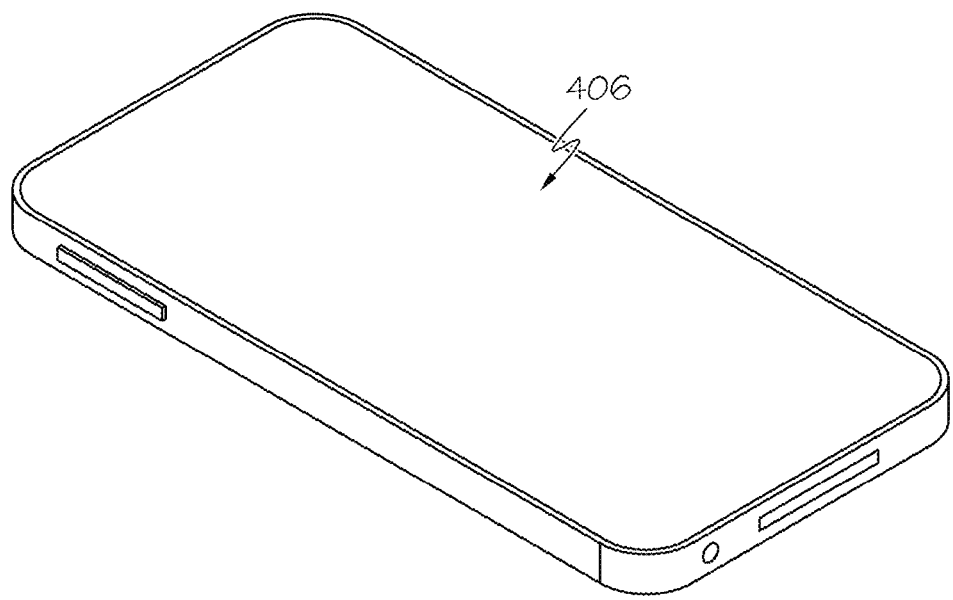
FIG. 13 is a perspective view of the exemplary electronic device of FIG. 11.

The textured glass articles described herein may be used for a variety of applications including, for example, back cover applications in consumer or commercial electronic devices such as smartphones, tablet computers, personal computers, ultrabooks, televisions, and cameras. An exemplary article incorporating any of the textured glass articles disclosed herein is shown in FIGS. 11-13. Specifically, FIGS. 11-13 show a consumer electronic device 400 including a housing 402 having front 404, back 406, and side surfaces 408; electrical components (not shown) that are at least partially inside or entirely within the housing and including at least a controller, a memory, and a display 410 at or adjacent to the front surface of the housing; and a cover substrate 412 at or over the front surface of the housing such that it is over the display. In embodiments, a portion of housing 402, such as the back 406, may include any of the textured glass articles disclosed herein.

EXAMPLES

In order that various embodiments be more readily understood, reference is made to the following examples, which illustrate various embodiments of the textured glass articles described herein.

Glass articles having Glass Compositions 1-3 as shown in Table 1 were treated as described below.

The compositions of Glass Articles 1-3 treated as described below are shown in Table 1. Note that reference to "Glass Article 1," "Glass Article 2," and "Glass Article 3," refers to a glass article that has the respective composition shown in Table 1. References to Glass Articles 1-3 do not refer to the same Glass Articles 1-3, respectively, that were treated multiple times with the various etchants.

TABLE 1

| Glass Article | 1 | 2 | 3 |
|---|---|---|---|
| $SiO_2$ (wt %) | 56.54 | 61.81 | 65.30 |
| $Al_2O_3$ (wt %) | 23.89 | 19.73 | 16.92 | article was then dried in ambient conditions to form the respective example textured glass article.

TABLE 2

| Etchant | Comparative Etchant 1 | Example Etchant 1 |
|---|---|---|
| HF (wt %) | 6 | 5 |
| $NH_4HF_2$ (wt %) | 15 | — |
| KCl (wt %) | — | 30 |
| HCl (vol %) | — | 10 (1.2M) |
| $C_3H_8O_2$ (vol %) | 10 | — |
| pH | 3.5 | approx. 0 |

TABLE 3

| Textured Glass | $CG_A$ | $CG_B$ | $EG_A$ | $EG_B$ |
|---|---|---|---|---|
| Glass Article | 1 | 2 | 1 | 2 |
| Etchant | Comparative Etchant 1 | Comparative Etchant 1 | Example Etchant 1 | Example Etchant 1 |
| Treatment Time (min) | 8 | 8 | 8 | 8 |
| Etchant Precipitate | | | | |
| $(H_3O)_2SiF_6$ (wt %) | 78 | 61 | 0 | 0 |
| $(Al(H_2O)_6)F_3$ (wt %) | 22 | 37 | 0 | 0 |
| Calcium Magnesium Aluminum Fluoride (wt %) | 0 | 2.1 | 0 | 0 |
| Hieratite($K_2SiF_6$) (wt %) | 0 | 0 | 87 | 9.5 |
| Sylvite (KCl) (wt %) | 0 | 0 | 9.3 | 5.3 |
| Demartinite ($K_2SiF_6$) (wt %) | 0 | 0 | 3.8 | 0 |

TABLE 1-continued

| Glass Article | 1 | 2 | 3 |
|---|---|---|---|
| $B_2O_3$ (wt %) | — | 3.93 | — |
| $Na_2O$ (wt %) | 9.94 | 12.85 | 14.35 |
| $K_2O$ (wt %) | — | — | 0.02 |
| $Li_2O$ (wt %) | 2.73 | — | — |
| MgO (wt %) | — | 1.47 | 3.33 |
| ZnO (wt %) | 1.40 | — | — |
| $P_2O_5$ (wt %) | 5.18 | — | — |
| $SnO_2$ (wt %) | 0.10 | 0.21 | 0.26 |
| $ZrO_2$ (wt %) | — | — | 0.01 |
| $Fe_2O_3$ (wt %) | — | 0.02 | — |

Example 1—Comparison of Higher and Lower pH Etchants

Table 2 shows the composition of Comparative Etchant 1 and Example Etchant 1. Table 3 shows the respective treatment times, respective properties of the resultant textured glass articles, and the respective etchant precipitate compositions.

Figure 14:
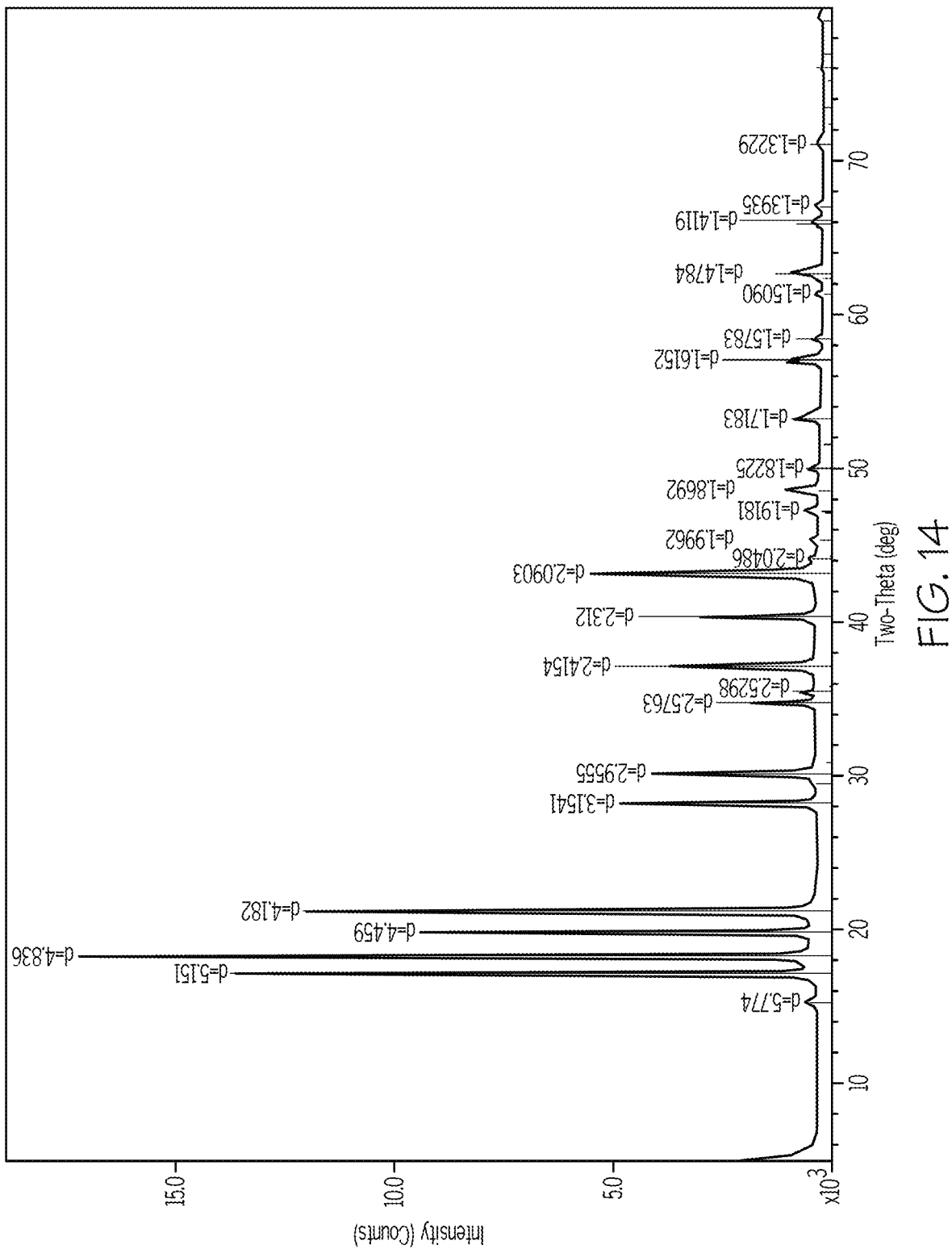
FIG. 14 is an X-ray diffraction (XRD) spectrum of a conventional glass article formed via an etching process.

Comparative Textured Glass Articles $CG_A$ and $CG_B$ and Example Textured Glass Articles $EG_A$ and $EG_B$ were formed by treating Glass Articles 1 and 2 with Comparative Etchant 1 and Example Etchant 1. The glass articles were 50 mm×50 mm×1.1 mm slides. Prior to treatment with the respective etchant, the glass articles were pre-cleaned with 3M HF/2.4 M HCl solution for 4 minutes. The glass articles were treated with the respective etchant by vertically dipping and holding the glass article in the etchant for the period of time shown in Table 3. The glass article were then removed from the etchant and rinsed with DI water. Salt crusts adhering to the glass article were removed by a scrubber sponge. The glass Treating Example Glass Articles 1 and 2 with Comparative Etchant 1 formed Comparative Textured Glass Articles $CG_A$ and $CG_B$, the surfaces of which are depicted in FIGS. 2 and 3. As shown, Comparative Textured Glass Articles $CG_A$ and $CG_B$ had small, dendritic features. Referring now to FIG. 14 and Table 3, the composition of the etchant precipitate resulting from treating Glass Articles 1 and 2 with Comparative Etchant 1 was determined by XRD analysis. For example, the XRD spectrum of Comparative Textured Glass Article $CG_B$ shown in FIG. 14 included peaks indicating the presence of metal flurosilicate ($MSiF_6$) and aluminofluoride ($MAlF_6$). Accordingly, the resulting etchant precipitate of Comparative Textured Glass Articles $CG_A$ and $CG_B$ included a mixture of metal flurosilicate ($MSiF_6$) and aluminofluoride ($MAlF_6$). While not wishing to be bound by theory, the precipitation of aluminofluoride resulted in the small, dendritic features. As exemplified by FIGS. 2, 3, and 14 and Tables 2 and 3, treating aluminosilicate glass articles comprising greater than 16 wt % $Al_2O_3$ with higher pH (i.e., greater than 2.2) etchants results in small (i.e., less than 10 μm), dendritic features.

Figure 15:
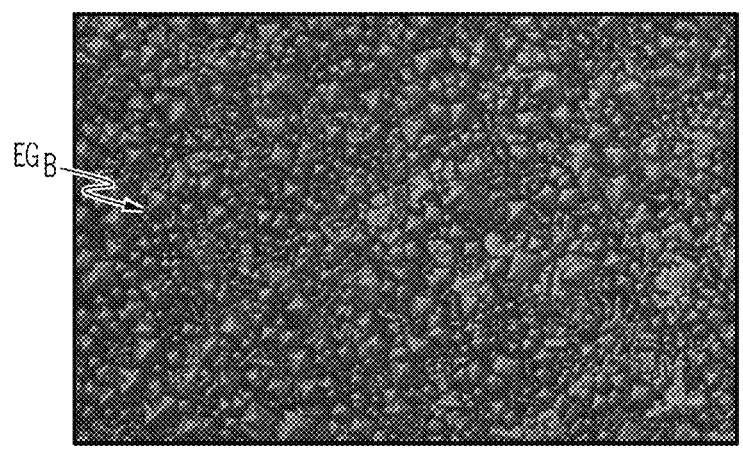
FIG. 15 is an optical microscope image of a textured glass article, according to one or more embodiments shown and described herein.
Figure 16:
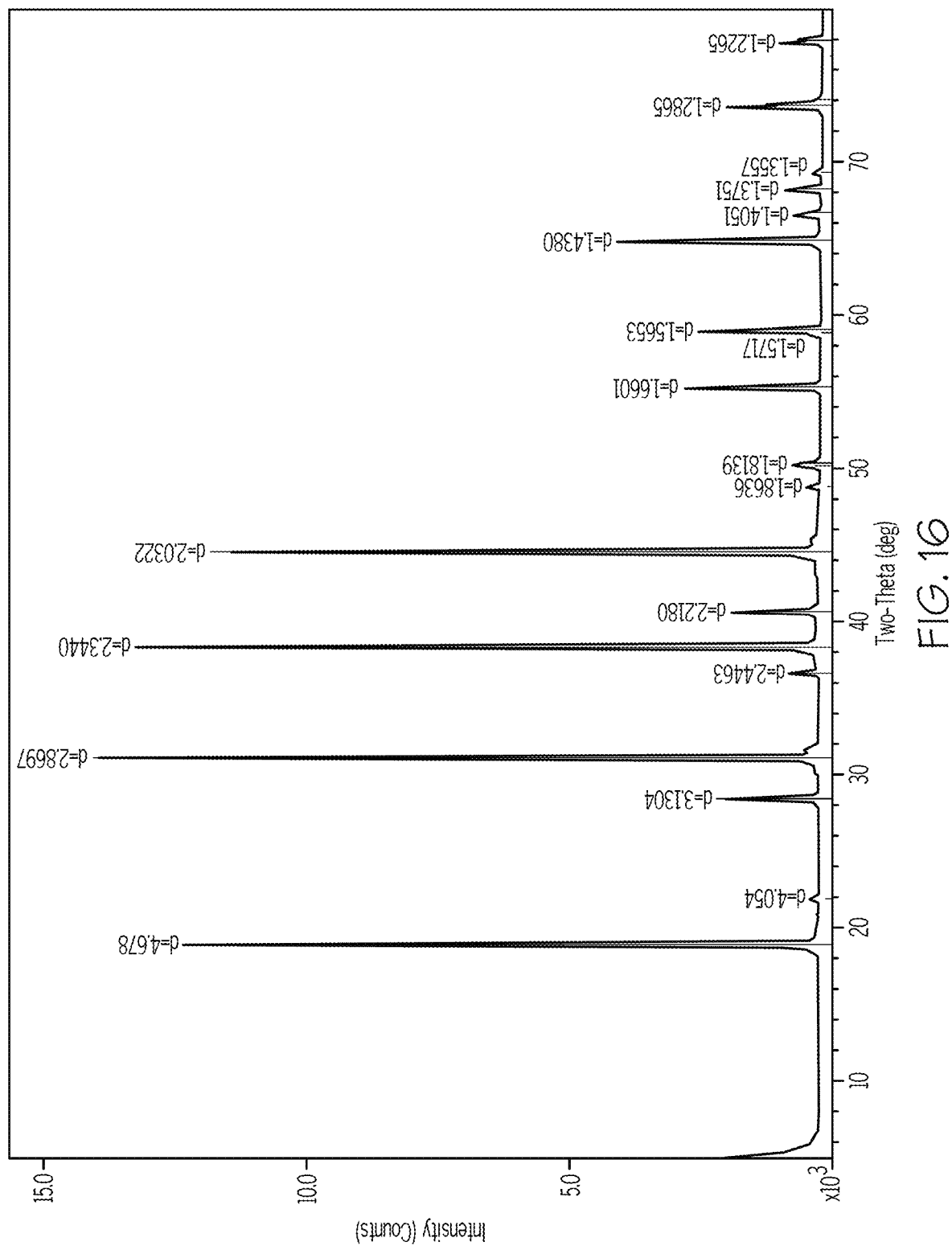
FIG. 16 is an XRD spectrum of a textured glass article, according to one or more embodiments shown and described herein.

Treating Example Glass Articles 1 and 2 with Example Etchant 1 formed Examples Textured Glass Articles $EG_A$ and $EG_B$. The surface of Textured Glass Article $EG_B$ is depicted in FIG. 15. As shown, Example Textured Glass Article $EG_B$ had large, polyhedral crystal structures. Referring now to FIG. 16 and Table 3, the composition of the etchant precipitate resulting from treating Glass Articles 1 and 3 with Example Etchant 1 was determined by XRD analysis. For example, the XRD spectrum of Example Textured Glass Article $EG_B$ shown in FIG. 16 included peaks indicating the presence of metal fluorosilicate-type precipitates (i.e., precipitates containing $SiF_6$, such as hieratite and demartinite) and did not include any peaks indicating the presence of aluminofluroide-type precipitates (i.e., precipitates containing Al). Accordingly, the resulting etchant precipitate of Example Textured Glass Articles $EG_A$ and $EG_B$ included metal fluorosilicate-type precipitates and did not include any aluminofluoride-type precipitates. While not wishing to be bound by theory, the precipitation of only metalfluorosilicate-type precipitates resulted in the large, polyhedral structures. As exemplified by FIGS. 15 and 16 and Tables 2 and 3, treating aluminosilicate glass articles comprising greater than 16 wt % $Al_2O_3$ with lower pH (i.e., less than or equal to 2.2) etchants results in large (i.e., greater than or equal to 10 μm), polyhedral surface features.

Example 2: Ammonium Salt Etchants

Table 4 shows the composition of ammonium salt Example Etchants 1-4. Table 5 shows the respective treatment times and respective properties of the resultant textured glass articles. Example Textured Glass Articles $EG_C$-$EG_F$ were formed by treating Glass Article 1 with Example Etchants 2-5. The glass articles were 50 mm×50 mm×1.1 mm slides. Prior to treatment with the respective ammonium etchant, the glass articles were pre-cleaned with 5 wt % HF/HCL solution for 2 minutes. The glass articles were treated with the respective etchant by vertically dipping and holding the glass article in the etchant for the period of time shown in Table 4. The glass articles were then removed from the etchant and rinsed with DI water. Salt crusts adhering to the glass article were removed by a scrubber sponge. The glass article was then dried in ambient conditions to form the respective example textured glass article.

TABLE 4

| Etchant | Example Etchant 2 | Example Etchant 3 | Example Etchant 4 | Example Etchant 5 |
|---|---|---|---|---|
| $NH_4Cl$ (wt %) | 40 | 40 | — | — |
| HF (wt %) | 8 | 8 | — | — |
| $NH_4HF_2$ (wt %) | — | 10 | 32 | 27 |
| HCl (wt %) | — | — | 18 | 15 |
| $H_2O$ (wt %) | 52 | 52 | 50 | 58 |
| pH | 0.5 | 0.5 | 0 | 0.5 |

TABLE 5

| Textured Glass | $EG_C$ | $EG_D$ | $EG_E$ | $EG_F$ |
|---|---|---|---|---|
| Glass Article | 1 | 1 | 1 | 1 |
| Etchant | Example Etchant 2 | Example Etchant 3 | Example Etchant 4 | Example Etchant 5 |
| Treatment Time (min) | 20 | 8 | 4 | 4 |
| Surface Feature Size (μm) | 292 | 65 | 83 | 294 |
| Transmittance Haze (%) | 88.9 | 94.4 | 81.5 | 69.9 |
| Surface Roughness (μm) | 9.909 | 2.370 | 6.295 | 4.841 |

Example Etchant 2 was prepared by mixing 40 wt % ammonium chloride, 8 wt % hydrofluoric acid, and 52 wt % water. After stirring for 12 hours, the supernatant was decanted in a polyethylene vial for treatment of Glass Article 1.

Figure 17:
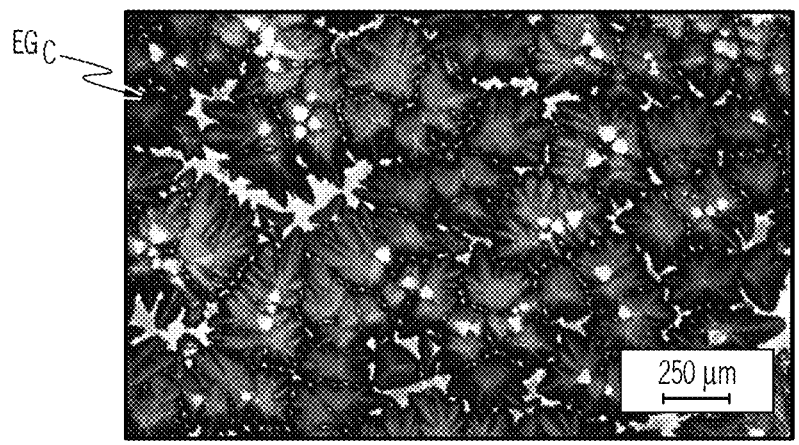
FIG. 17 is an optical microscope image with a magnification of 50× of a textured glass article, according to one or more embodiments shown and described herein.
Figure 18:
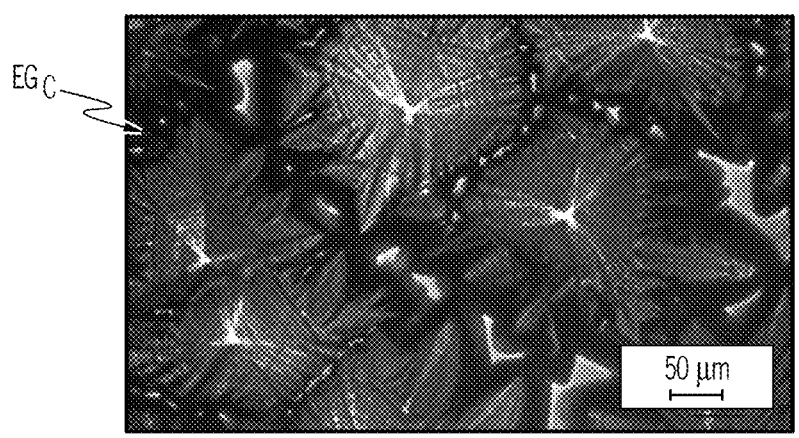
FIG. 18 is an optical microscope image with a magnification of 200× of the textured glass article shown in FIG. 17.

Treating Glass Article 1 with Example Etchant 2 formed Example Textured Glass Article $EG_C$, the surface of which is depicted in FIGS. 17 and 18 at different magnifications. The resulting surface features had a pyramidal morphology with a surface feature size of 292 μm. The apexes of the surface features were sharp and the facets were triangular or rectangular. The bases of the surface features included a dendritic structure extending from the base of each surface feature. Example Textured Glass Article $EG_C$ had a transmittance haze of 88.9% and a surface roughness Ra of 9.909 μm.

Example Etchant 3 was prepared by mixing 40 wt % ammonium chloride, 8 wt % hydrofluoric acid, and 52 wt % water. After stirring for 12 hours, the supernatant was decanted in a polyethylene vial for treatment of Glass Article 2. 10 wt % ammonium bifluoride was added in the supernatant and stirred for an additional 2 hours.

Figure 19:
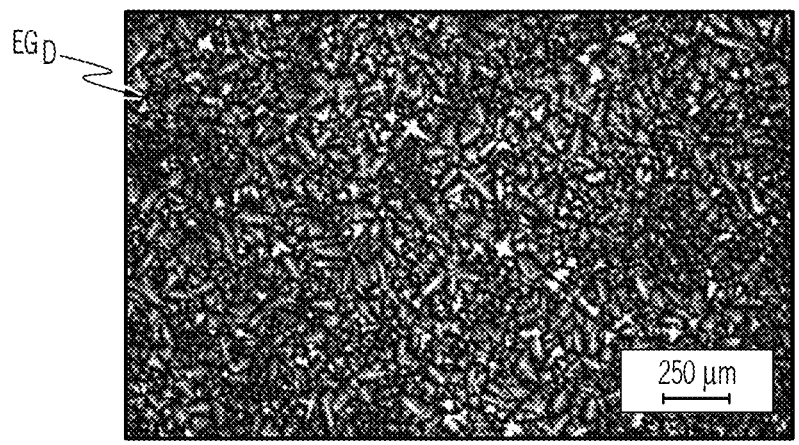
FIG. 19 is an optical microscope image with a magnification of 50× of a textured glass article, according to one or more embodiments shown and described herein.
Figure 20:
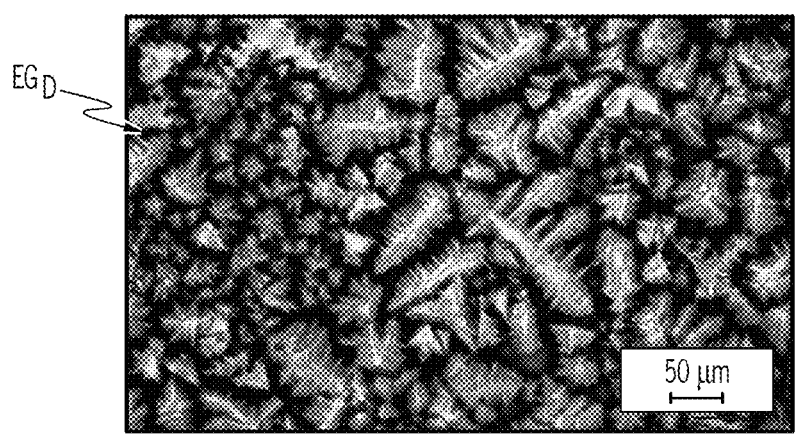
FIG. 20 is an optical microscope image with a magnification of 200× of the textured glass article shown in FIG. 19.

Treating Glass Article 1 with Example Etchant 3 formed Example Textured Glass Article $EG_D$, the surface of which is depicted in FIGS. 19 and 20 at different magnifications. The resulting surface features had a pyramidal morphology with a surface feature size of 65 μm. The apexes of the surface features were sharp. The facets were triangular or rectangular. The bases of the surface features included a dendritic structure extending from the base. Example Textured Glass Article $EG_D$ had a transmittance haze of 94.4% and a surface roughness Ra of 2.307 μm.

Example Etchant 4 was prepared by mixing 32 wt % ammonium bifluoride, 18 wt % hydrochloric acid, and 50 wt % water. After stirring for 12 hours, the supernatant was decanted in a polyethylene vial for treatment of Glass Article 1.

Figure 21:
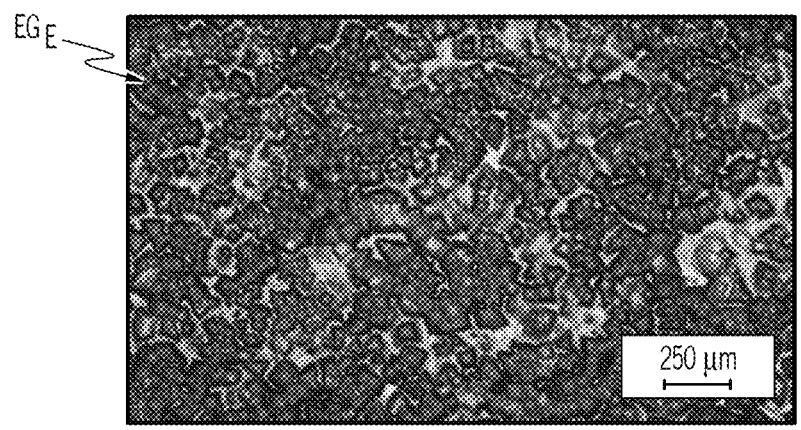
FIG. 21 is an optical microscope image with a magnification of 50× of a textured glass article, according to one or more embodiments shown and described herein.
Figure 22:
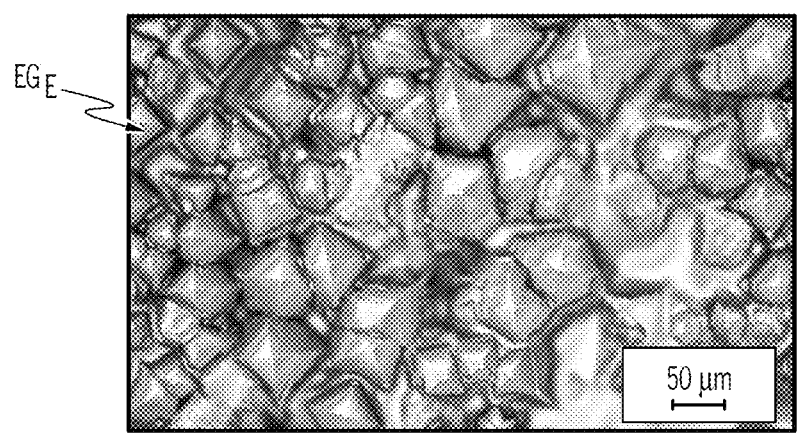
FIG. 22 is an optical microscope image with a magnification of 200× of the textured glass article shown in FIG. 21.

Treating Glass Article 1 with Example Etchant 4 formed Example Textured Glass Article $EG_E$, the surface of which is depicted in FIGS. 21 and 22 at different magnifications. The resulting surface features had a pyramidal morphology with a surface feature size of 83 μm. The apexes of the surface features were sharp. The facets were rectangular. The bases of the surface features did not include a dendritic structure. Example Textured Glass Article $EG_E$ had a transmittance haze of 81.5% and a surface roughness Ra of 6.295 μm.

Example Etchant 5 was prepared by mixing 27 wt % ammonium bifluoride, 15 wt % hydrochloric acid, and 58 wt % water. After stirring for 12 hours, the supernatant was decanted in a polyethylene vial for treatment of Glass Article 1.

Figure 23:
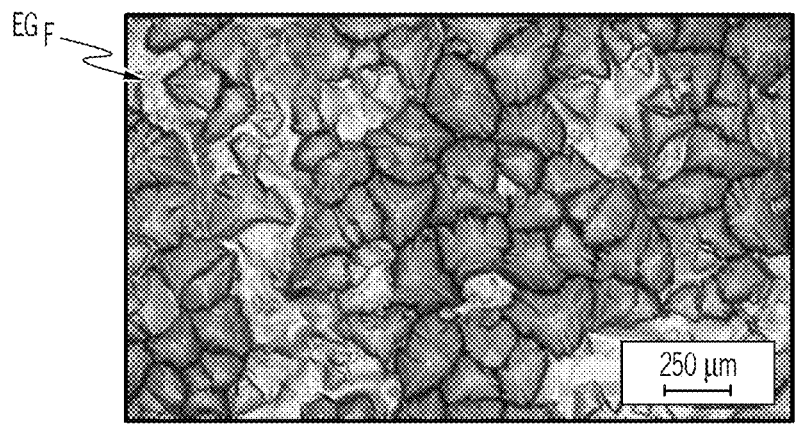
FIG. 23 is an optical microscope image with a magnification of 50× of a textured glass article, according to one or more embodiments shown and described herein.
Figure 24:
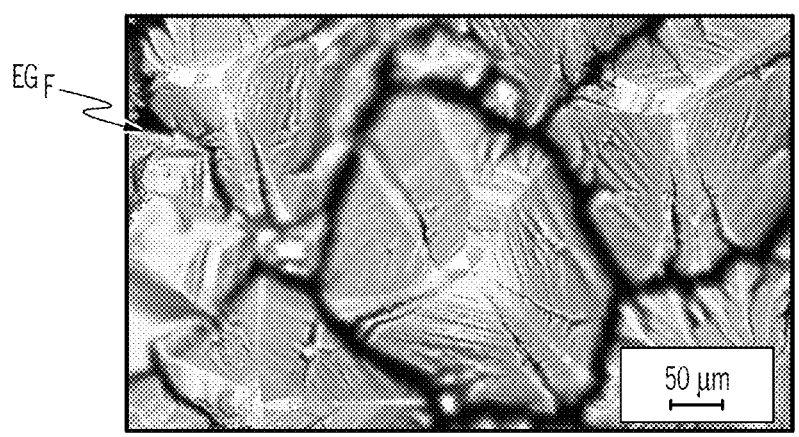
FIG. 24 is an optical microscope image with a magnification of 200× of the textured glass article shown in FIG. 23.

Treating Glass Article 1 with Example Etchant 5 formed Example Textured Glass Article $EG_F$ the surface of which is depicted in FIGS. 23 and 24 at different magnifications. The resulting surface features had a pyramidal morphology with a surface feature size of 294 μm. The apexes of the surface features were sharp and the facets were triangular. The bases of the surface features did not include a dendritic structure. Example Textured Glass Article $EG_F$ has a transmittance haze of 69.9% and a surface roughness Ra of 4.841 μm.

As exemplified by FIGS. 17-24 and Tables 4 and 5, treating aluminosilicate glass articles comprising greater than or equal to 16 wt % $Al_2O_3$ with an etchant having a pH less than or equal to 2.2 results in the formation of polyhedral surface features having a surface feature size at the base greater than or equal to 10 μm and less than or equal to 350 μm.

Example 3: Potassium Salt Etchants

Table 6 shows potassium salt Example Etchants 6-8. Table 7 shows the respective treatment times and respective properties of the resultant textured glass articles. Example Textured Glass Articles $EG_G$-$EG_M$ were formed by treating Glass articles 1-3 with Example Etchants 6-8. Example Etchants 6-8 were prepared by mixing the ingredients shown in Table 6. After stirring for 12 hours, the supernatant was decanted in a polyethylene vial for treatment of the respective example glass article. The glass articles were 50 mm×50 mm×1.1 mm slides pre-cleaned with 3M HF/2.4 M HCl solution for 4 minutes. The glass articles were treated with the etchant by vertically dipping and holding the glass article in the etchant for 8 minutes. The glass article was then removed from the etchant and rinsed with DI water. Salt crusts adhering to the glass article were removed by a scrubber sponge. The glass article was then dried in ambient condition to form the respective example textured glass article.

TABLE 6

| Etchant | Example Etchant 6 | Example Etchant 7 | Example Etchant 8 |
|---|---|---|---|
| HF (wt %) | 10 | 5 | 10 |
| $K_2SO_4$ (wt %) | 15 | 15 | — |
| KCl (wt %) | — | — | 40 |
| HCl (vol %) | 10 (1.2M) | 10 (1.2M) | 10 (1.2M) |
| pH | approx. 0 | approx. 0 | approx. 0 |

TABLE 7

| | Textured Glass | | | | | | |
|---|---|---|---|---|---|---|---|
| | $EG_G$ | $EG_H$ | $EG_I$ | $EG_J$ | $EG_K$ | $EG_L$ | $EG_M$ |
| Glass Article | 1 | 2 | 3 | 2 | 1 | 2 | 3 |
| Etchant | Example Etchant 6 | Example Etchant 6 | Example Etchant 6 | Example Etchant 7 | Example Etchant 8 | Example Etchant 8 | Example Etchant 8 |
| Treatment Time (min) | 8 | 8 | 8 | 8 | 8 | 8 | 8 |
| Surface Feature Size (μm) | — | about 20 | — | — | — | about 20 | — |
| Transmittance Haze (%) | — | — | — | — | — | — | — |
| Surface Roughness (μm) | — | 0.403 | — | — | — | 0.376 | — |

Figure 25:
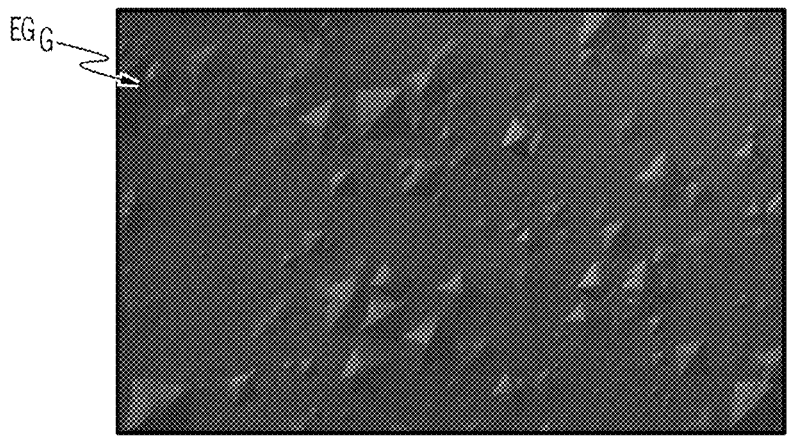
FIG. 25 is an optical microscope image of a textured glass article, according to one or more embodiments shown and described herein.
Figure 26:
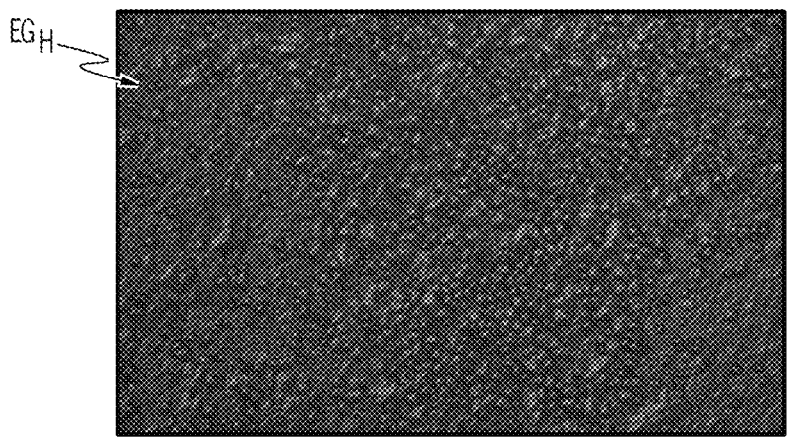
FIG. 26 is an optical microscope image of a textured glass article, according to one or more embodiments shown and described herein.
Figure 27:
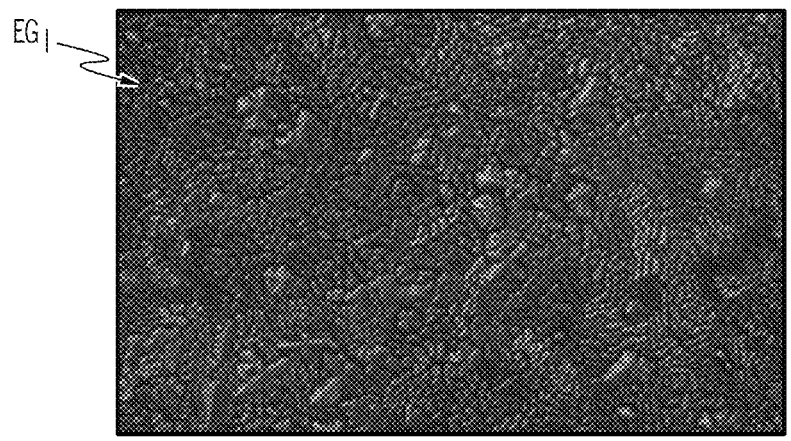
FIG. 27 is an optical microscope image of a textured glass article, according to one or more embodiments shown and described herein.

Treating Glass Articles 1-3 with Example Etchant 6 resulted in Example Textured Glass Articles $EG_G$, $EG_H$, and $EG_I$, the surfaces of which are shown in FIGS. 25, 26, and 27, respectively. Example Etchant 6, which exhibits a low pH of approximately 0 because of the addition of HCl, produced highly reflective, polyhedral surface features on the glass articles.

Figure 28:
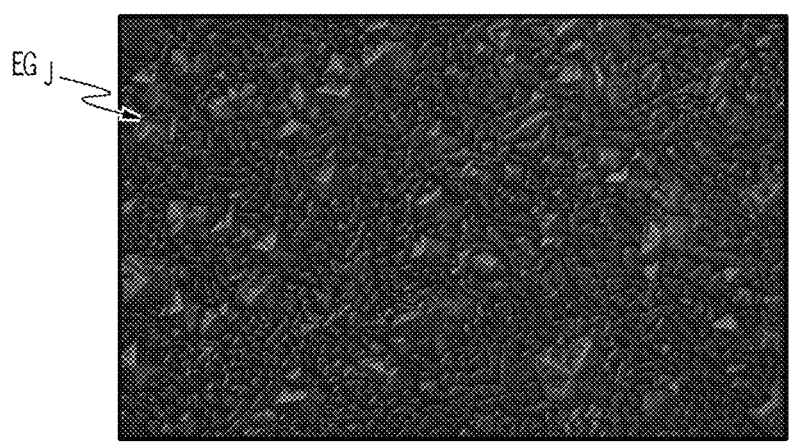
FIG. 28 is an optical microscope image of a textured glass article, according to one or more embodiments shown and described herein.

Treating Glass Article 2 with Example Etchant 7 resulted in Example Textured Glass Article $EG_J$, the surface of which is depicted in FIG. 28. Example Etchant 7 produced highly reflective, polyhedral surface features that were larger than those achieved with Example Etchant 6 as shown in FIG. 26. As exemplified by FIGS. 26 and 28, reducing the hydrofluoric acid amount in the etchant results in relatively larger surface features. While not wishing to be bound by theory, hydrochloric acid dissolves the precipitate better than hydrofluoric acid. Thus, reducing the amount of hydrofluoric acid reduces the crystal seed density, allowing the crystal seeds to grow larger and resulting in relatively larger surface features.

Figure 29:
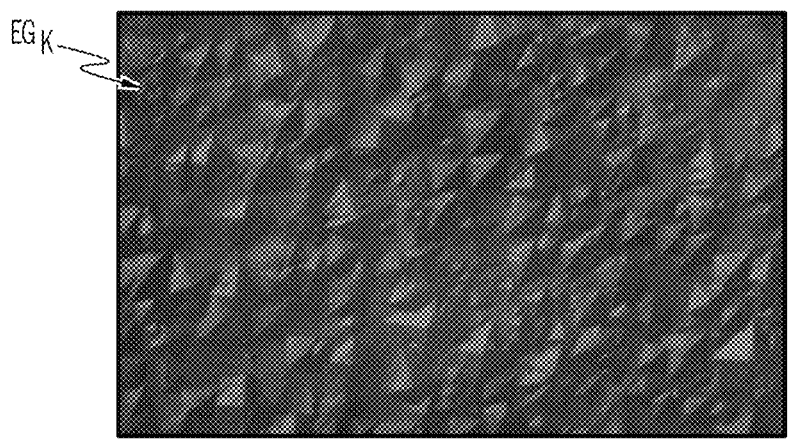
FIG. 29 is an optical microscope image of a textured glass article, according to one or more embodiments shown and described herein.
Figure 30:
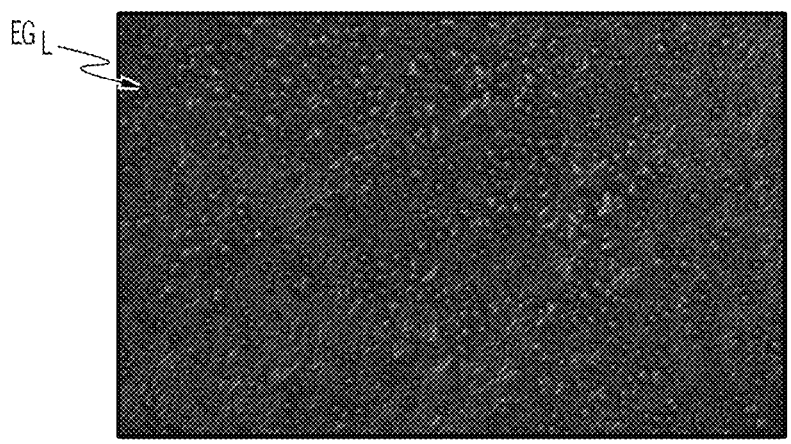
FIG. 30 is an optical microscope image of a textured glass article, according to one or more embodiments shown and described herein.
Figure 31:
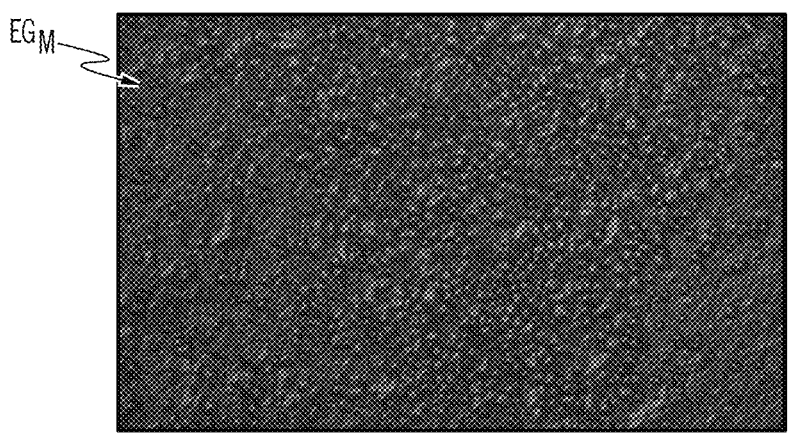
FIG. 31 is an optical microscope image of a textured glass article, according to one or more embodiments shown and described herein.
Figure 32:
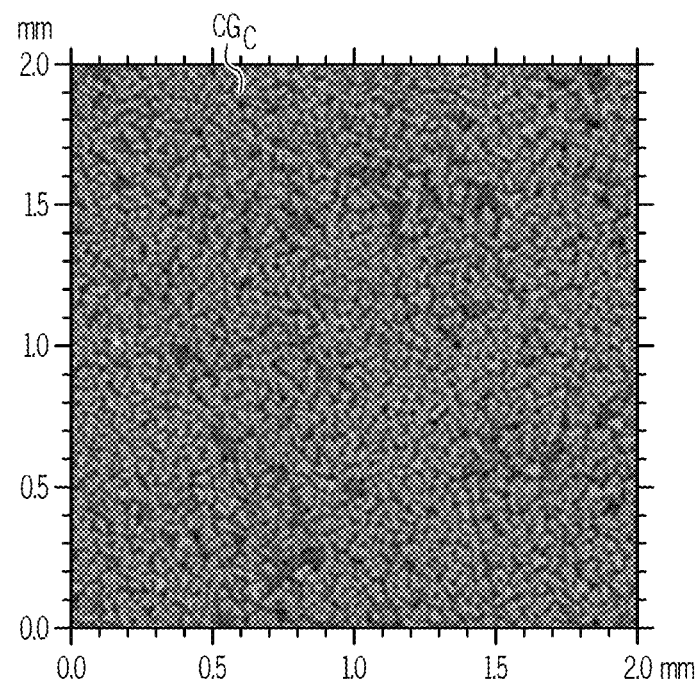
FIG. 32 is a white light interferometry surface image of a 2 mm×2 mm area of a comparative textured glass article.
Figure 33:
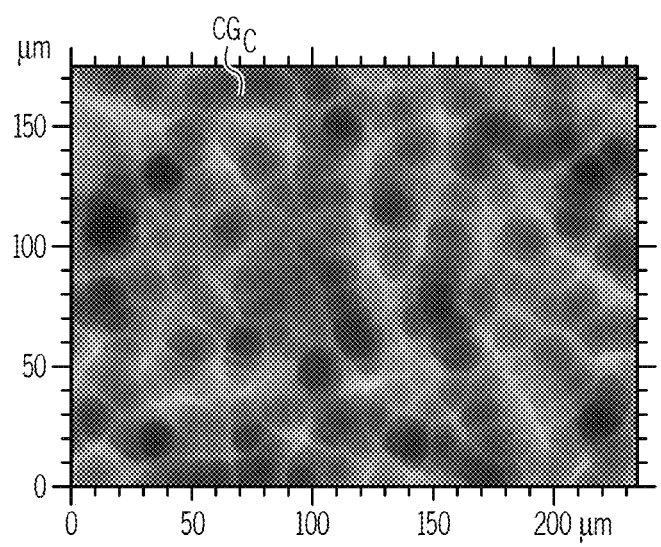
FIG. 33 is a white light interferometry surface image of a 175 µm×235 µm area of the comparative textured glass article shown in FIG. 32.
Figure 34:
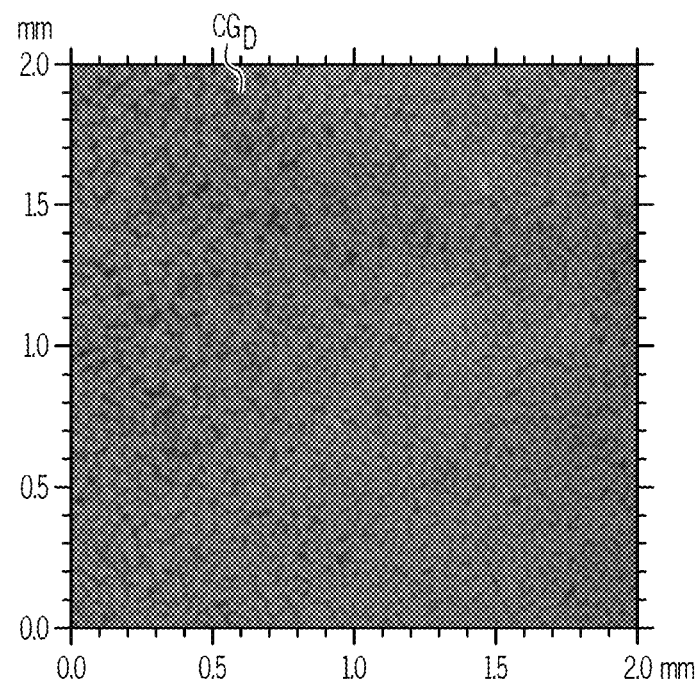
FIG. 34 is a white light interferometry surface image of a 2 mm×2 mm area of a comparative textured glass article.
Figure 35:
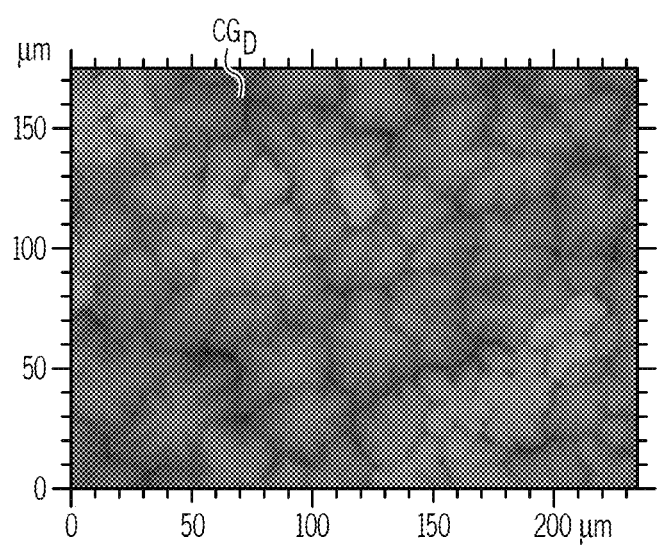
FIG. 35 is a white light interferometry surface image of a 175 µm×235 µm area of the comparative textured glass article shown in FIG. 34.
Figure 36:
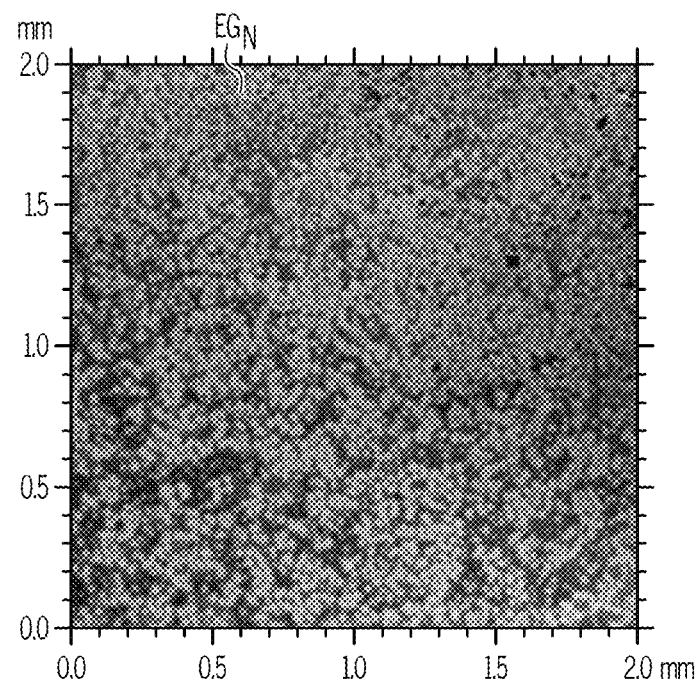
FIG. 36 is a white light interferometry surface image of a 2 mm×2 mm area of a textured glass article, according to one or more embodiments shown and described herein.
Figure 37:
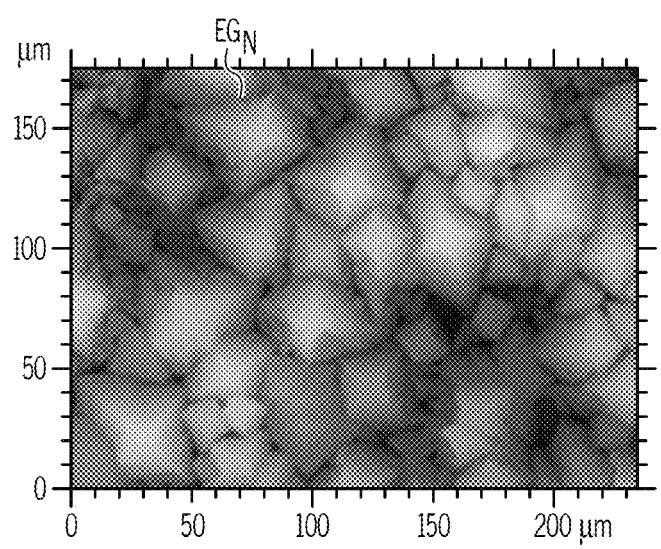
FIG. 37 is a white light interferometry surface image of a 175 µm×235 µm area the textured glass article shown in FIG. 36.
Figure 38:
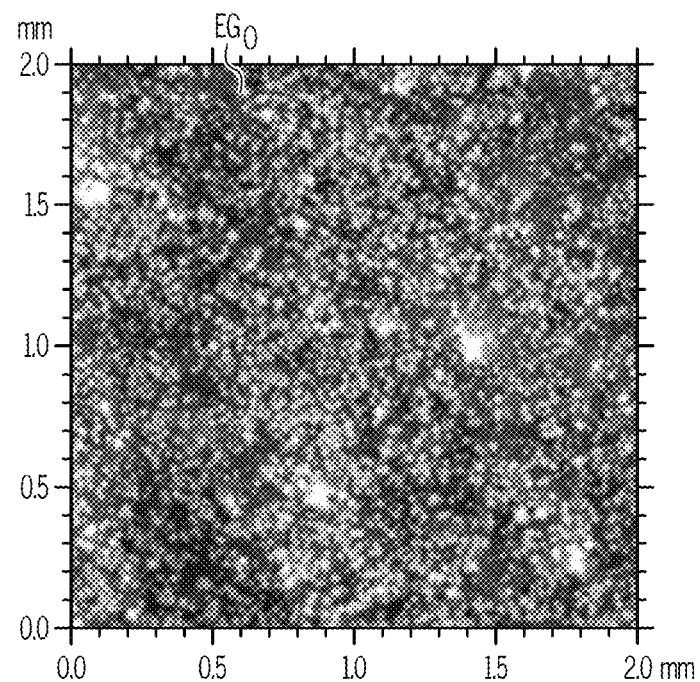
FIG. 38 is a white light interferometry surface image of a 2 mm×2 mm area of a textured glass article, according to one or more embodiments shown and described herein.
Figure 39:
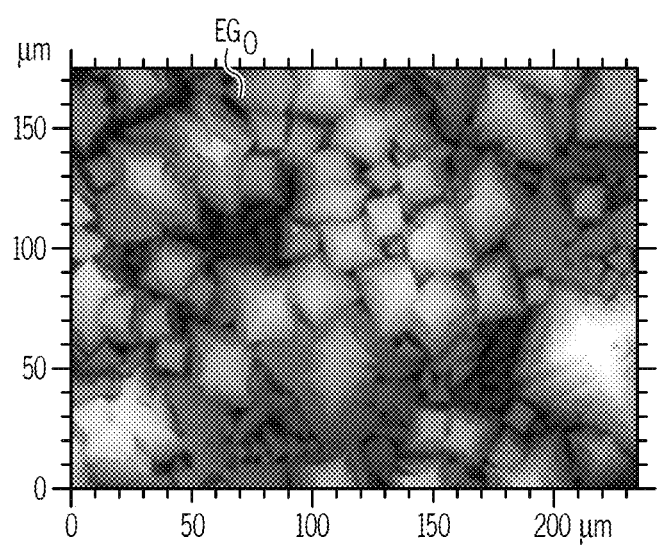
FIG. 39 is a white light interferometry surface image of a 175 µm×235 µm area of the textured glass article shown in FIG. 38.
Figure 40:
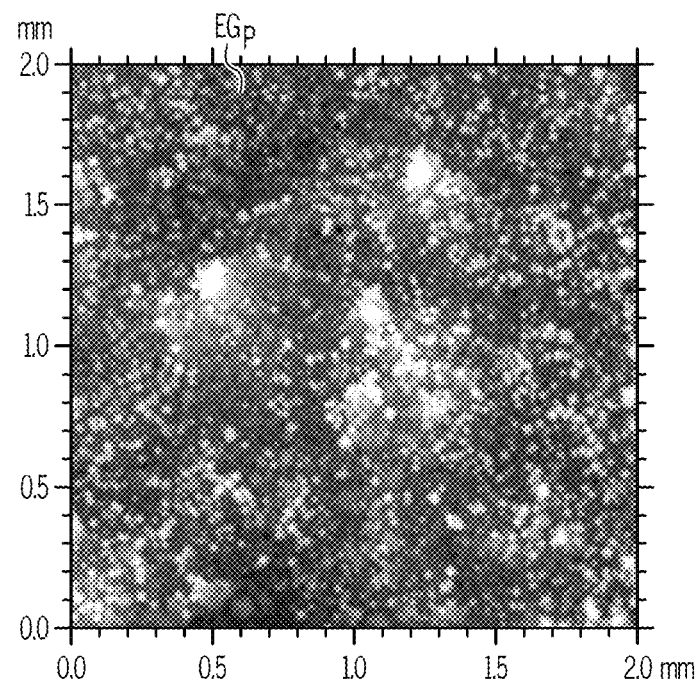
FIG. 40 is a white light interferometry surface image of a 2 mm×2 mm area a textured glass article, according to one or more embodiments shown and described herein.
Figure 41:
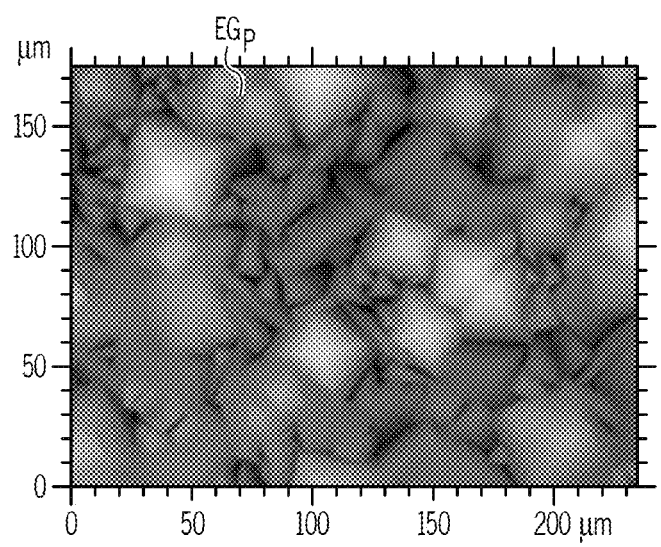
FIG. 41 is a white light interferometry surface image of a 175 µm×235 µm area the textured glass article shown in FIG. 40.

Treating Glass Articles 1-3 with Example Etchant 8 resulted in Example Textured Glass Articles $EG_K$, $EG_L$, and $EG_M$, the surfaces of which are depicted in FIGS. 29, 30, and 31, respectively. Example Etchant 8, which exhibits a low pH of approximately 0 because of the addition of HCl, produced highly reflective, polyhedral surface features on the glass articles.

Treating Glass Article 2 with Example Etchant 1 resulted in Example Textured Glass Article $EG_B$, the surface of which is depicted in FIG. 15. Example Etchant 1 produced highly reflective, polyhedral crystal structures that were larger than those achieved with Example Etchant 8 as shown in FIG. 30. As exemplified by FIGS. 15 and 30, reducing the hydrofluoric acid amount in the etchant resulted in relatively larger surface features.

Example 4: Surface Structure Data and Optical Characteristics

Table 8 shows Comparative Etchants 2 and 3 and Example Etchants 9 and 10. Table 9 shows the respective treatment times and respective properties of the resultant textured glass articles.

Comparative Textured Glass Articles $CG_C$ and $CG_D$ and Example Textured Glass Articles $EG_N$, $EG_O$, and $EG_P$ were formed by treating Glass Article 2 with Comparative Etchants 2 and 3, Example Etchant 1 (shown in Table 2) and Etchants 9 and 10. The glass articles were 50 mm×50 mm×1.1 mm slides. Prior to treatment with the respective ammonium etchant, the glass articles were pre-cleaned with 3M HF/2.4 M HCl solution for 2 minutes. The glass articles were treated with the respective etchant by vertically dipping and holding the glass article in the etchant for the period of time shown in Table 9. The glass article were then removed from the etchant and rinsed with DI water. Salt crusts adhering to the glass article were removed by a scrubber sponge. The glass article was then dried in ambient conditions to form the respective example textured glass article.

TABLE 8

| Etchant | Comparative Etchant 2 | Comparative Etchant 3 | Example Etchant 9 | Example Etchant 10 |
|---|---|---|---|---|
| $NH_4F$ (wt %) | 15 | — | — | — |
| HF (wt %) | 6 | 5 | 5 | 5 |
| KCl (wt %) | — | 10 | 20 | 20 |
| $C_3H_8O_2$ (vol %) | 10 | — | — | — |
| HCl (vol %) | — | 2 (0.24M) | 10 (1.2M) | 15 (1.8M) |
| pH | 3.2 | 0.6 | 0.08 | 0.26 |

TABLE 9

| Textured Glass | $CG_C$ | $CG_D$ | $EG_N$ | $EG_O$ | $EG_P$ |
|---|---|---|---|---|---|
| Glass Article | 2 | 2 | 2 | 2 | 2 |
| Etchant | Comparative Etchant 2 | Comparative Etchant 3 | Example Etchant 1 | Example Etchant 9 | Example Etchant 10 |
| Treatment Time (min) | 8 | 8 | 8 | 8 | 8 |
| Surface Structure Data | | | | | |
| Mean Sa (μm) | 0.687 | 0.367 | 1.080 | 1.199 | 0.970 |
| Sa Std. Dev. (μm) | 0.024 | 0.014 | 0.065 | 0.039 | 0.143 |
| Sa change vs. $CG_C$ (%) | — | — | 57 | 75 | 41 |
| Sa change vs. $CG_D$ (%) | — | — | 195 | 227 | 164 |
| Mean Sq (μm) | 0.851 | 0.457 | 1.309 | 1.469 | 1.239 |
| Sq Std. Dev. (μm) | 0.026 | 0.020 | 0.070 | 0.055 | 0.153 |
| Sq change vs. $CG_C$ (%) | — | — | 54 | 73 | 46 |
| Sq change vs. $CG_D$ (%) | — | — | 186 | 221 | 171 |
| Mean Sdr (%) | 6.223 | 2.509 | 22.405 | 19.803 | 8.176 |
| Sdr Std. Dev. (&) | 0.779 | 0.331 | 10.113 | 3.254 | 0.631 |
| Sdr change vs. $CG_C$ (%) | — | — | 260 | 218 | 31 |
| Sdr change vs. $CG_D$ (%) | — | — | 793 | 689 | 226 |
| Sal (mm) | 0.013 | 0.016 | 0.025 | 0.035 | 0.085 |
| Sal change vs. $CG_C$ (%) | — | — | 86 | 160 | 537 |
| Sal change vs. $CG_D$ (%) | — | — | 54 | 115 | 427 |
| Spc (mm$^{-1}$) | 3944 | 1781 | 14764 | 14641 | 9567 |
| Spc change vs. $CG_C$ (%) | — | — | 274 | 271 | 143 |
| Spc change vs. $CG_D$ (%) | — | — | 729 | 722 | 437 |
| Grayscale Distributions | | | | | |
| Peak GU (GU) | 57 | 68 | 94 | 85 | 81 |
| Peak GU change vs. $CG_C$ (%) | — | — | 65 | 67 | 42 |
| Peak GU change vs. $CG_D$ (%) | — | — | 38 | 40 | 19 |
| FWHM (GU) | 16 | 17 | 26 | 25 | 28 |
| FWHM change vs. $CG_C$ (%) | — | — | 63 | 56 | 75 |
| FWHM change vs. $CG_D$ (%) | — | — | 53 | 47 | 65 |
| Range of GU values (GU) | 68 | 87 | 152 | 141 | 219 |
| Range of GU change vs. $CG_C$ (%) | — | — | 124 | 107 | 222 |
| Range of GU change vs. $CG_D$ (%) | — | — | 75 | 62 | 152 |
| Skewness | 0.21 | -0.12 | 0.52 | 0.54 | 0.75 |
| Skewness change vs. $CG_C$ (%) | — | — | 148 | 157 | 257 |
| Skewness change vs. $CG_D$ (%) | — | — | 533 | 550 | 725 |
| Excess kurtosis | 0.15 | 0.18 | 0.95 | 1.01 | 2.15 |
| Excess kurtosis change vs. $CG_C$ (%) | — | — | 428 | 461 | 1094 |
| Excess kurtosis change vs. $CG_D$ (%) | — | — | 533 | 573 | 1333 |

Surface Structure Data

Referring now to FIGS. 32-41, the images shown, generated using a white light interferometer, were used to calculate surface structure data, including the mean Sa, mean Sq, mean Sdr, Sal, and Spc of the resultant textured glass articles shown in Table 9.

The mean Sa and mean Sq of Example Textured Glass Articles $EG_N$, $EG_O$, and $EG_P$ were on average 58% higher than the mean Sa and mean Sq of Comparative Textured Glass Article $CG_C$ and on average 194% higher than the mean Sa and mean Sq of Comparative Textured Glass Article $CG_D$. The higher mean Sa of the example textured glass articles indicated that those surfaces are rougher than the comparative textured glass articles; the higher mean Sq of the example textured glass articles indicated a wider distribution of surface feature height in the example textured glass articles as compared to the comparative textured glass articles.

The mean Sdr and Sal of Example Textured Glass Articles $EG_N$, $EG_O$, and $EG_P$ were higher than the mean Sdr and Sal of Comparative Textured Glass Articles $CG_C$ and $CG_D$. The higher mean Srd and Sal of the example textured glass articles indicated a greater angled surface area and a larger distance between surface features as compared to the comparative textured glass articles.

The Spc of Example Textured Glass Articles $EG_N$, $EG_O$, and $EG_P$ were 2 to 5 times larger than the Spc of Comparative Textured Glass Articles $CG_C$ and were 4 to 7 times larger than the Spc of Comparative Textured Glass Articles $CG_D$. The higher Spc of the example textured glass articles indicated a relatively higher amount of points of contact with other objects due to pointed shapes as compared to the comparative textured glass articles.

As exemplified by FIGS. 32-41 and Table 9, treating aluminosilicate glass articles comprising greater than or equal to 16 wt % $Al_2O_3$ with an etchant having a pH less than or equal to 2.2 results in the formation of polyhedral surface features as evidenced by relatively greater mean Sa, mean Sq, mean Sdr, Sal, and Spc.

Grayscale Distributions

Referring back to Table 9, the peak GU of Example Textured Glass Articles $EG_N$, $EG_O$, and $EG_P$ were on average 58% higher than the peak GU of Comparative Textured Glass Article $CG_C$ and on average 32% higher than the peak GU of Comparative Textured Glass Article $CG_D$. The higher peak GU indicated that more light was reflected from the surfaces of the example textured glass articles as compared to the comparative textured glass articles.

The FWHM of Example Textured Glass Articles $EG_N$, $EG_O$, and $EG_P$ were on average 60% greater than the FWHM of both Comparative Textured Glass Articles $CG_C$ and $CG_D$. The range of GU values of Example Textured Glass Articles $EG_N$, $EG_O$, and $EG_P$ were on average 150% greater than the range of GU values of Comparative Textured Glass Article CG$_C$ and on average 100% greater than the range of GU values of Comparative Textured Glass Article CG$_D$. The higher FWHM and range of GU values indicated that the polyhedral surface features of the example textured glass articles resulted in a relatively wider distribution of grayscale values.

The skewness of Example Textured Glass Articles EG$_N$, EG$_O$, and EG$_P$ were on average 190% greater than the skewness of Comparative Textured Glass Article CG$_C$ and on average 600% greater than the skewness of Comparative Textured Glass Article CG$_D$. The skewness of Comparative Textured Glass Articles CG$_C$ and CG$_D$ were near zero, which indicated a high degree of symmetry about the main peak. On the other hand, the skewness of Example Textured Glass Articles EG$_N$, EG$_O$, and EG$_P$ were noticeably larger than either of the comparative textured glass articles and were positive. The positive values showed that the "tails" on the right side of the example textured glass article distributions were longer and, thus, had greater amount of high intensity contributions to the distribution of light the comparative textured glass articles.

The excess kurtosis of the textured glass articles showed the same trends, with average increases of 660% and 810% in excess kurtosis of Example Textured Glass Articles EG$_N$, EG$_O$, and EG$_P$ over Comparative Textured Glass Articles CG$_C$ and CG$_D$. The excess kurtosis of Example Textured Glass Articles EG$_N$, EG$_O$, and EG$_P$ ranged from 0.95 to over 2.00, while the values for Comparative Textured Glass Articles CG$_C$ and CG$_D$ had an excess kurtosis under 0.020. The levels of excess kurtosis of the example textured glass articles indicated that there is a significant amount of grayscale value outliers in the polyhedral surface structures of the example textured glass articles.

As exemplified by Table 9, treating aluminosilicate glass articles comprising greater than or equal to 16 wt % Al$_2$O$_3$ with an etchant having a pH less than or equal to 2.2 results in the formation of polyhedral surface features that achieve a "glowing" (i.e., highly reflective) appearance as evidenced by relatively greater peak GU, FWHM, range of GU values, skewness, and excess kurtosis.

Bi-Directional Reflection Distribution Function (BRDF)

Figure 42:
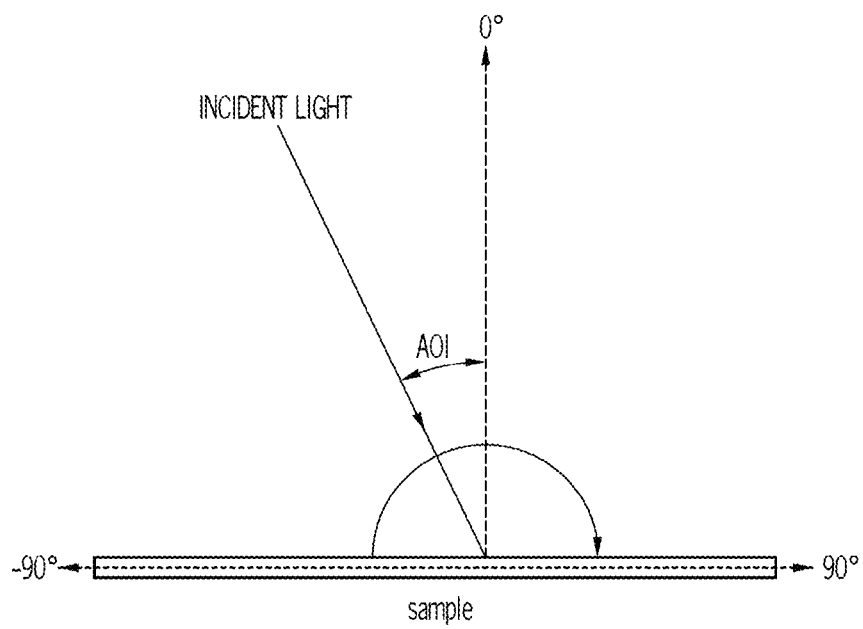
FIG. 42 is a schematic view of white light illumination in the bi-directional reflectance distribution function (BRDF) setup indicating angle of incidence (AOI) and sample orientation, according to one or more embodiments shown and described herein.
Figure 43:
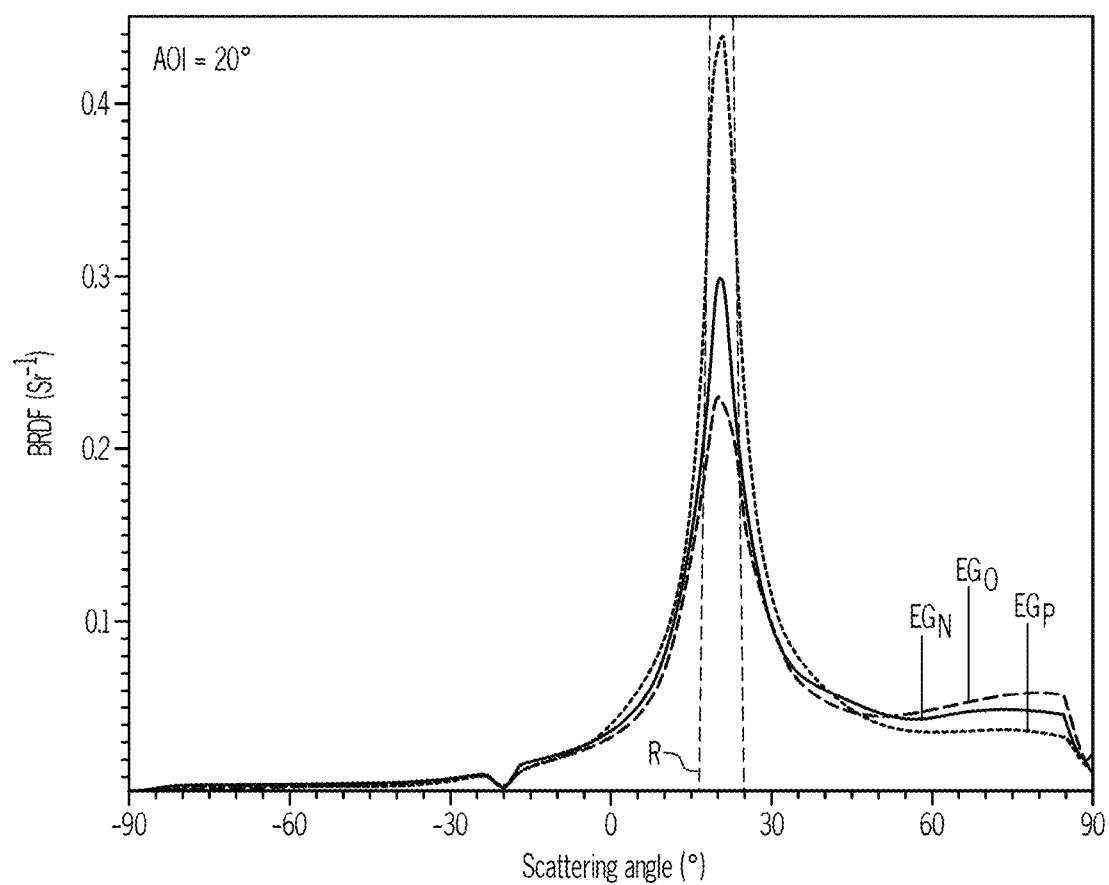
FIG. 43 is BRDF spectra of textured glass articles at an angle of incidence (AOI) of 20°, according to one or more embodiments shown and described herein.
Figure 44:
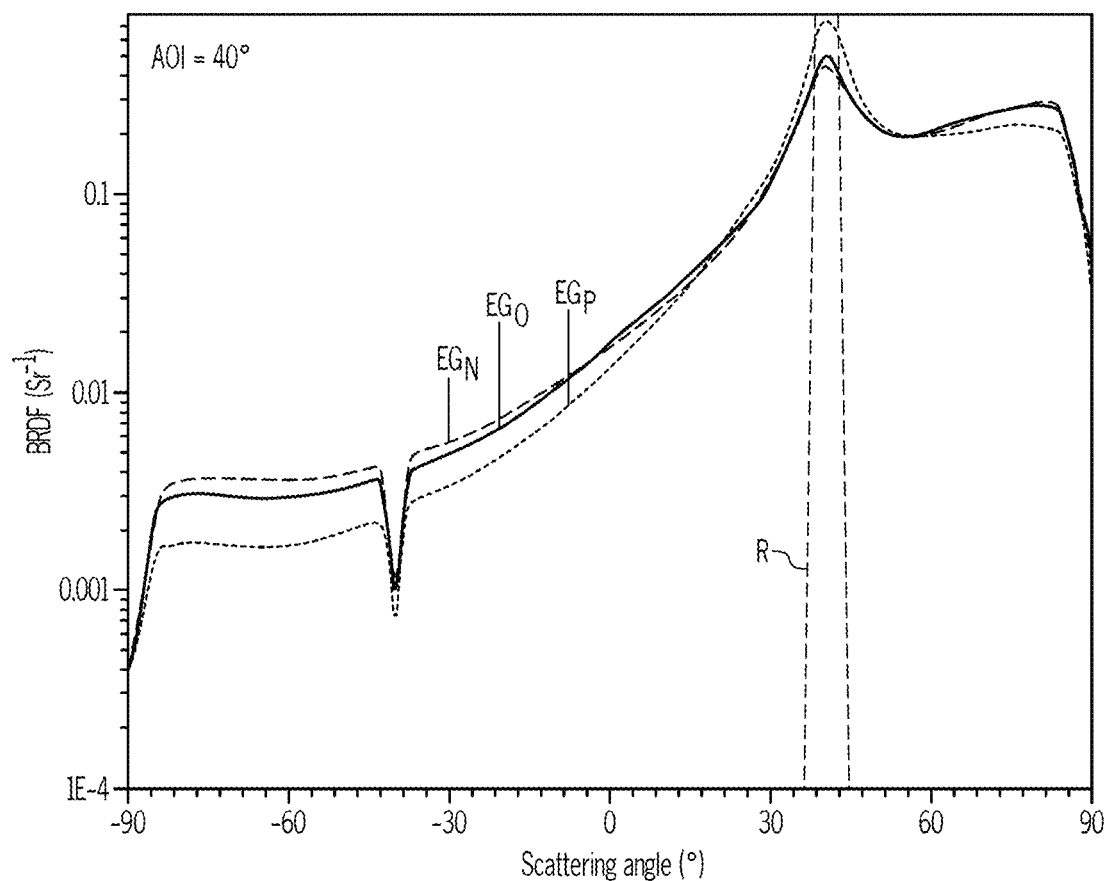
FIG. 44 is BRDF spectra of textured glass articles at an AOI of 40°, according to one or more embodiments shown and described herein.
Figure 45:
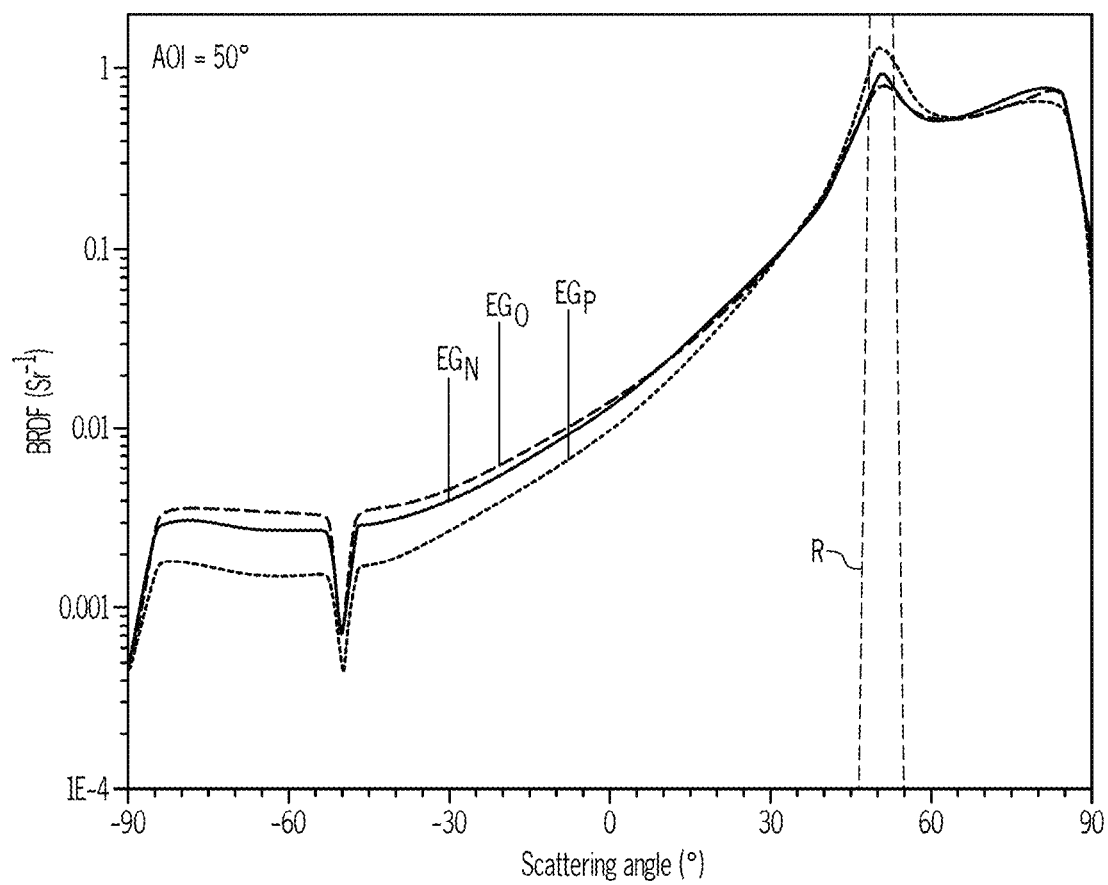
FIG. 45 is BRDF spectra of textured glass articles at an AOI of 50°, according to one or more embodiments shown and described herein.
Figure 46:
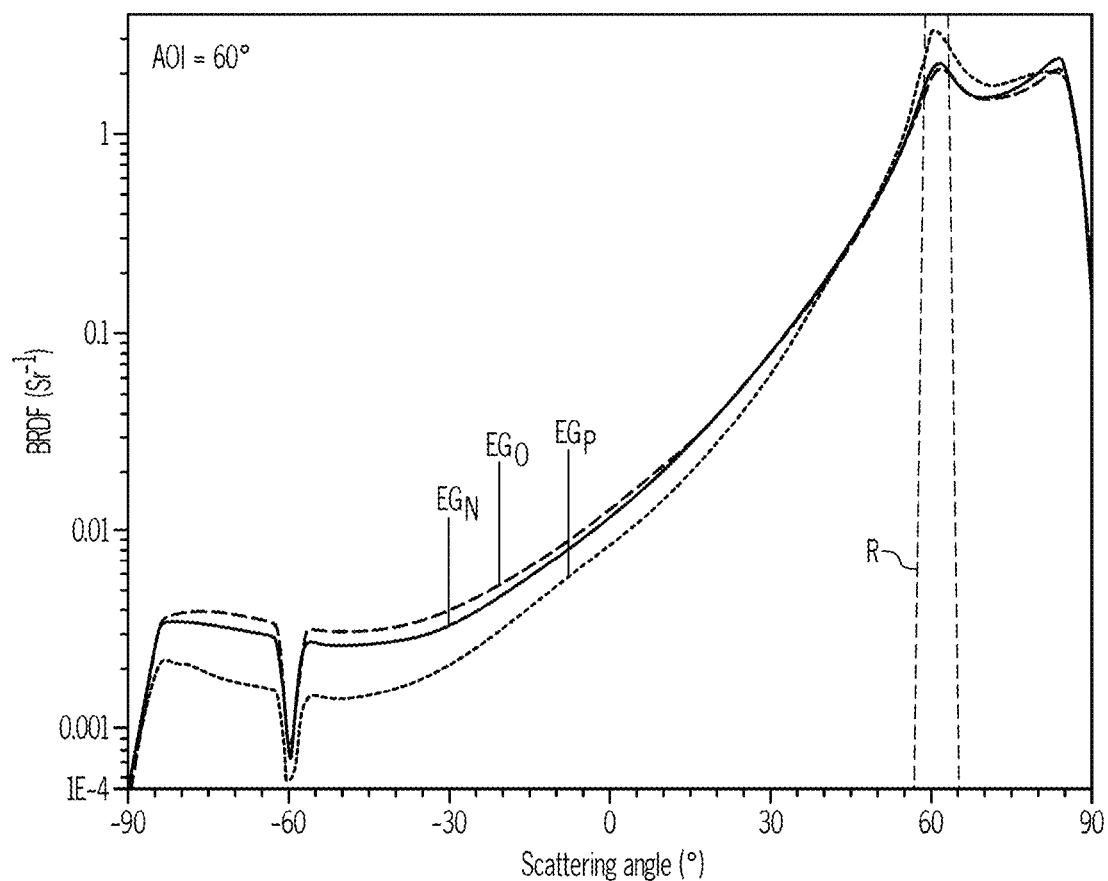
FIG. 46 is BRDF spectra of textured glass articles at an AOI of 60°, according to one or more embodiments shown and described herein.

BRDF spectra measured using a Reflet 180S goniometer performed along the plane parallel to the incident light field between −90° and 90° as shown in FIG. 42 are shown in FIGS. 43-46. Comparative Textured Glass Articles CG$_C$ and CG$_D$ and Example Textured Glass Articles EG$_N$, EG$_O$, and EG$_P$ and BRDF spectra measured using a Complete Angle Scattering Instrument (CASI) goniometer are shown in FIGS. 47-56.

Referring now to FIGS. 43-46, the BRDF spectra as a function of scattering as measured at an angle of incidence (AOI) of 20°, 40°, 50°, and 60°, respectively, are shown. The trough on the left side of the spectra are due to the detector blocking the light. Reference lines R in the plot correspond to a flat glass article and, in the absence of texturing, showed a narrow specular reflection peak centered at the respective AOI. On the other hand, Example Textured Glass Articles EG$_N$, EG$_O$, and EG$_P$ had broad specular reflection across the AOIs, indicating the "glowing" nature of the example textured glass articles at various viewing angles. Moreover, as the AOIs increased from 20° to 60°, multiple scatter peaks were distinguishable in the BRDF spectra of the example textured glass articles. Specifically, Example Textured Glass Articles EG$_N$, EG$_O$, and EG$_P$ not only had a peak within the reference lines, but also had a peak around 70°.

Figure 47:
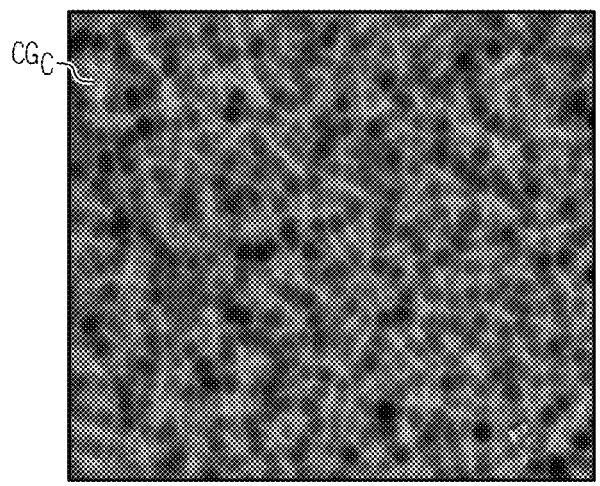
FIG. 47 is an optical microscope image of a comparative textured glass article.
Figure 48:
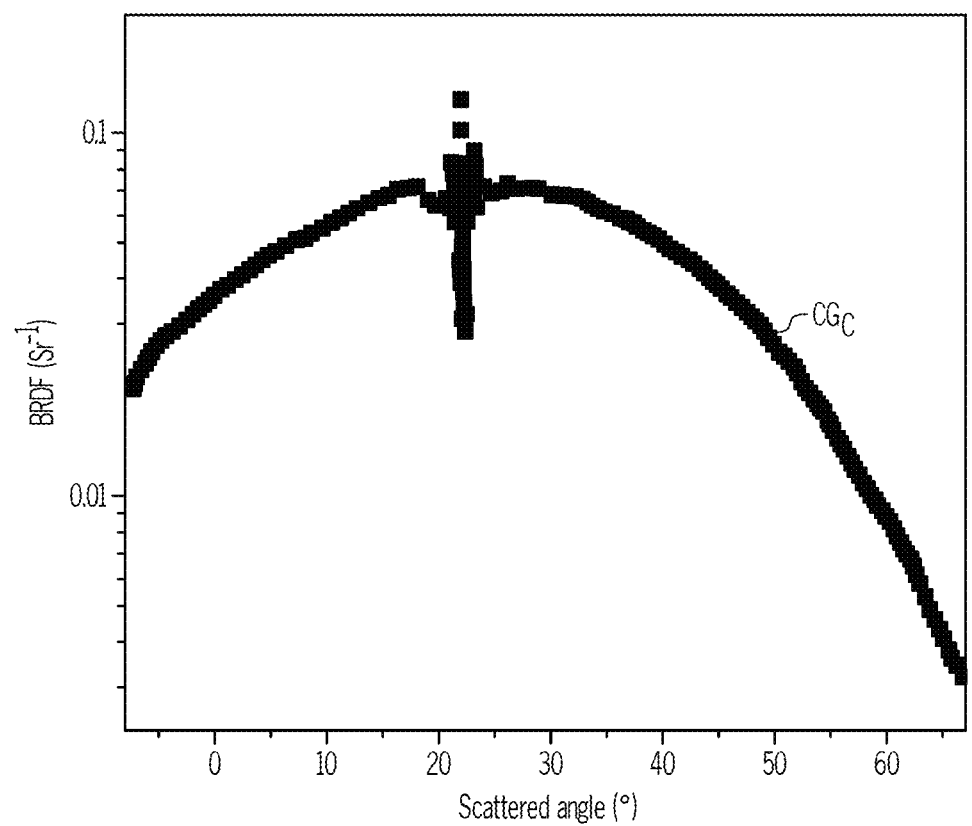
FIG. 48 is a Complete Angle Scattering (CASI) spectrum of the comparative textured glass article shown in FIG. 47.

Referring now to FIG. 47, Comparative Textured Glass Article CG$_C$ had a conventional surface texture. The corresponding BRDF spectrum shown in FIG. 48 exhibited no indication of secondary peaks.

Figure 49:
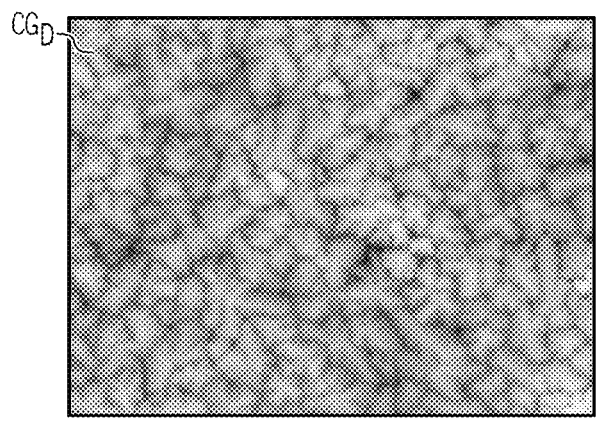
FIG. 49 is an optical microscope image of a comparative textured glass article.
Figure 50:
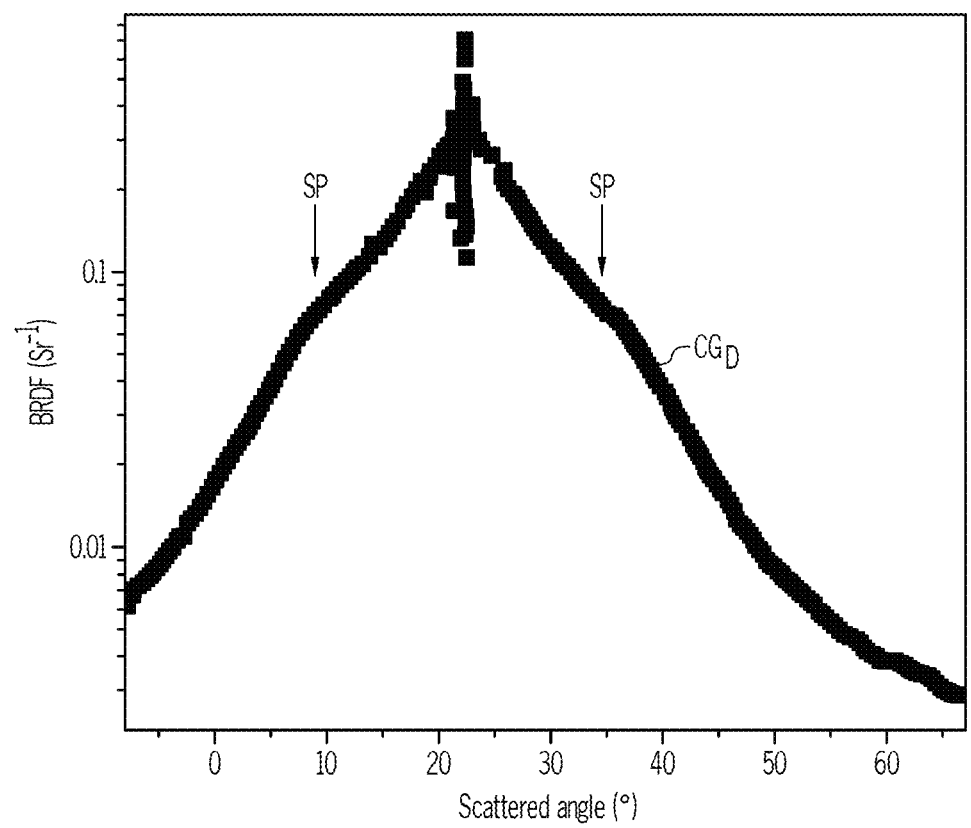
FIG. 50 is a CASI spectrum of the comparative textured glass article shown in FIG. 49.

Referring now to FIG. 49, Comparative Textured Glass Article CG$_D$ had a dendritic surface texture. The corresponding BRDF spectrum shown in FIG. 50 exhibited some evidence of secondary peaks SP, due to the dendritic structure.

Figure 51:
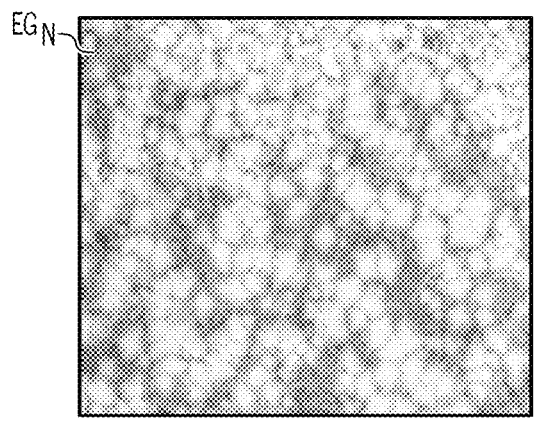
FIG. 51 is an optical microscope image of a textured glass article, according to one or more embodiments shown and described herein.
Figure 52:
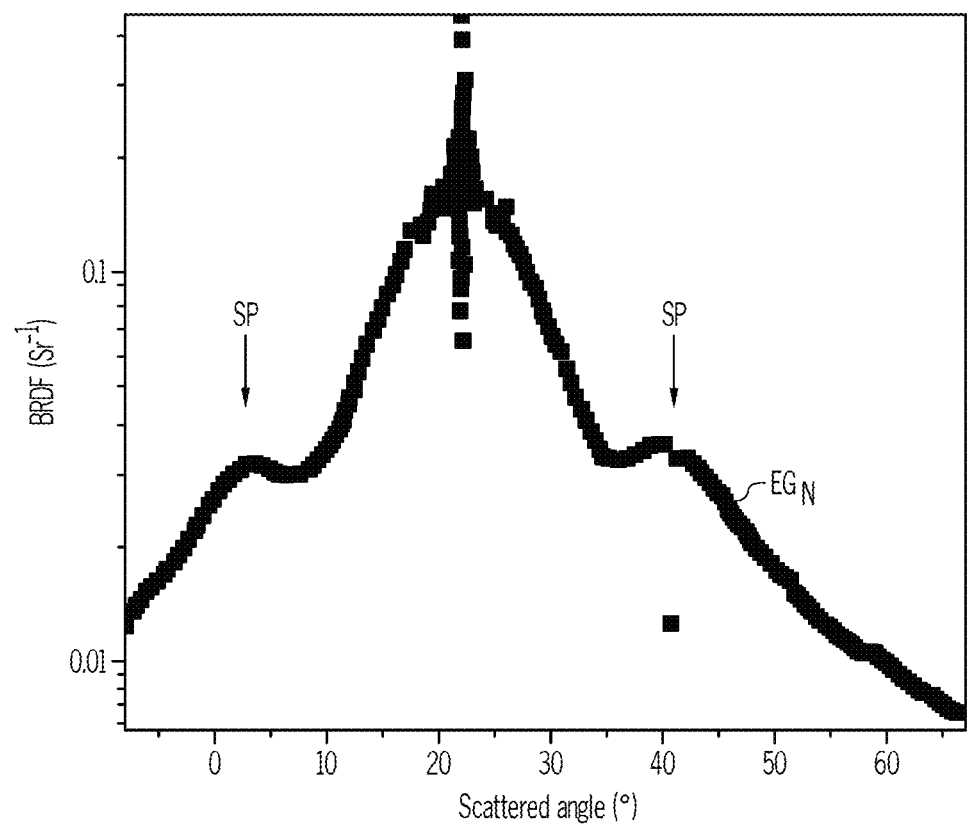
FIG. 52 is a CASI spectrum of the textured glass article shown in FIG. 51.
Figure 53:
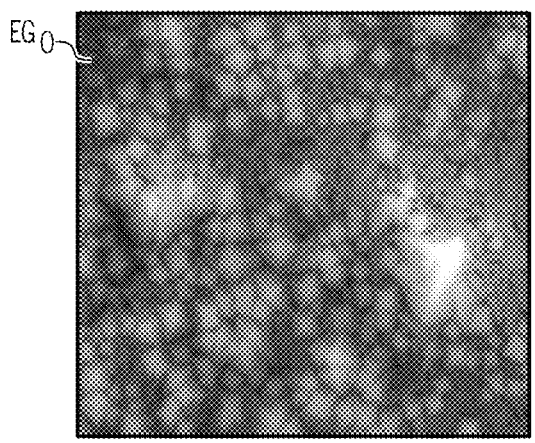
FIG. 53 is an optical microscope image of a textured glass article, according to one or more embodiments shown and described herein.
Figure 54:
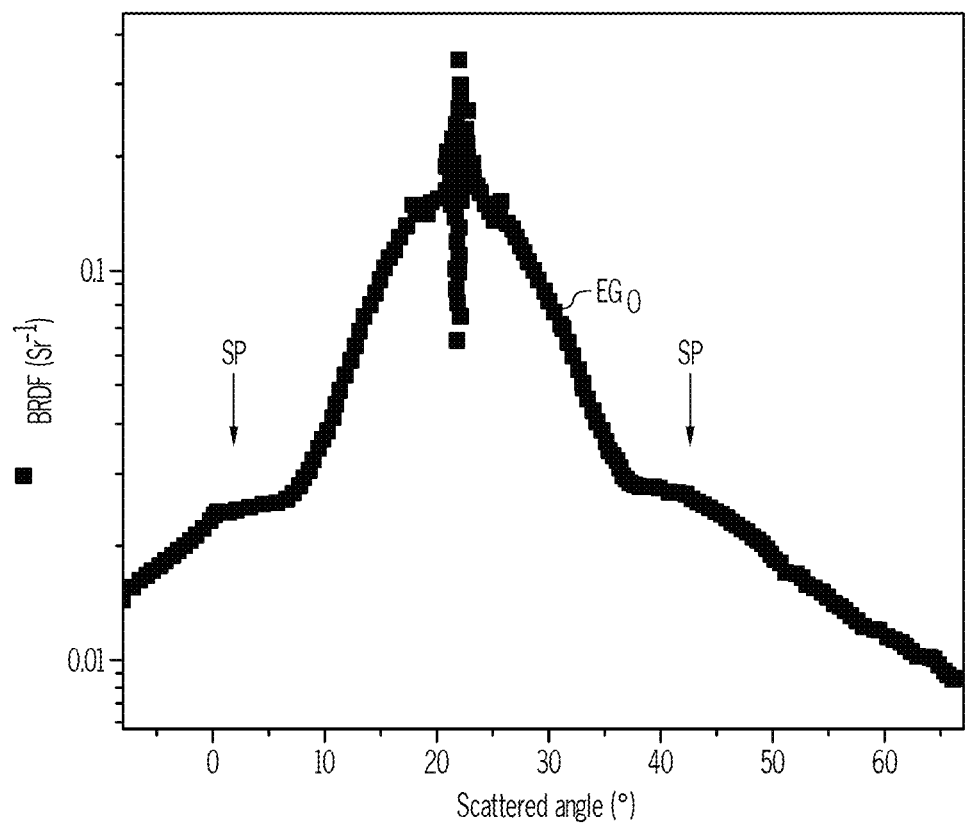
FIG. 54 is a CASI spectrum of the textured glass article shown in FIG. 53.
Figure 55:
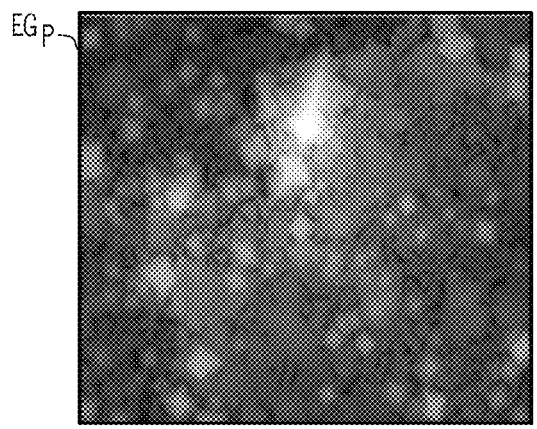
FIG. 55 is an optical microscope image of a textured glass article, according to one or more embodiments shown and described herein.
Figure 56:
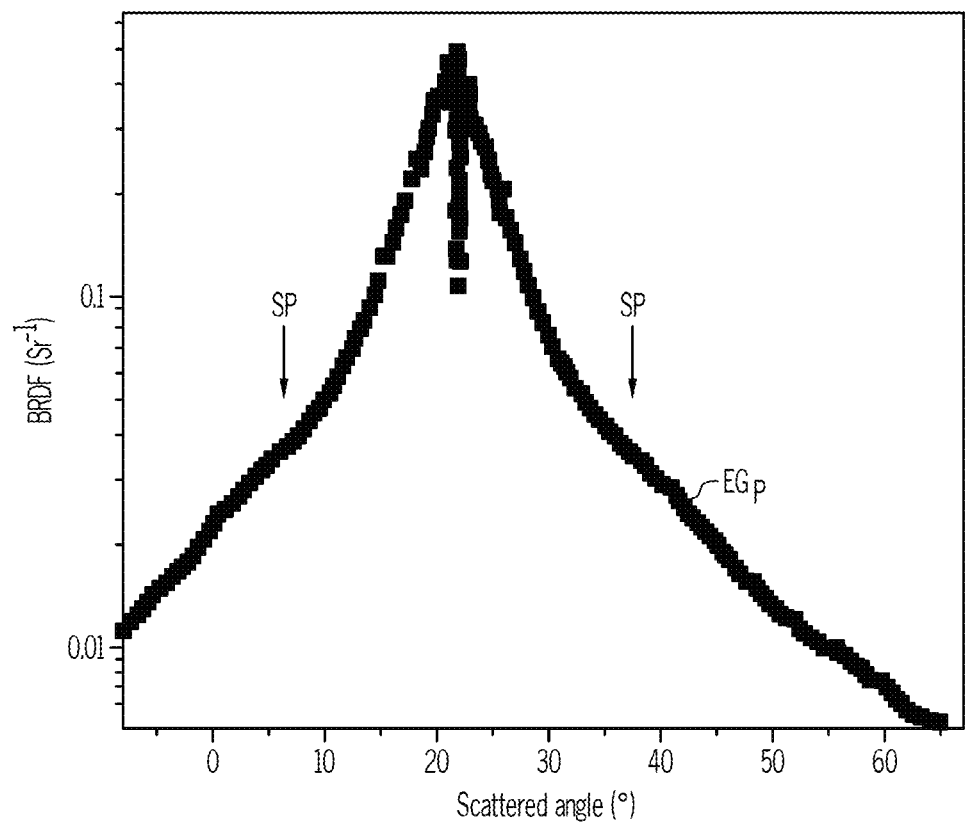
FIG. 56 is a CASI spectrum of the textured glass article shown in FIG. 55.

Referring now to FIGS. 51, 53, and 55, Example Textured Glass Articles EG$_N$, EG$_O$, and EG$_P$ had a polyhedral surface structure. The corresponding BRDF spectra shown in FIGS. 52, 54, and 56 exhibited two prominent secondary peaks SP that were separated in angle from the main peak by approximately 15° to 20°. While not wishing to be bound by theory, it is believed that the secondary peaks observed in the BRDF spectra of the example textured glass articles are a signature of the high reflectance from the facets of the polyhedral surface structures.

As exemplified by FIGS. 43-56, treating aluminosilicate glass articles comprising greater than or equal to 16 wt % Al$_2$O$_3$ with an etchant having a pH less than or equal to 2.2 results in the formation of polyhedral surface features that achieve a "glowing" (i.e., highly reflective) appearance as evidenced by multiple scatter peaks observed in a BRDF spectrum.

It will be apparent to those skilled in the art that various modifications and variations may be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A textured glass article comprising:
    a body comprising an aluminosilicate glass comprising greater than or equal to 16 wt % Al$_2$O$_3$, the body having at least a first surface; and
    a plurality of polyhedral surface features extending from the first surface, each of the plurality of polyhedral surface features comprising a base on the first surface and a plurality of facets extending from the first surface, wherein the plurality of polyhedral surface features comprises a surface feature size at the base greater than or equal to 10 μm and less than or equal to 350 μm, wherein the plurality of facets of each polyhedral surface feature converge toward one another,
    wherein the textured glass article has a transmittance haze greater than or equal to 40%.

2. The textured glass article of claim 1, wherein the plurality of facets of each polyhedral surface feature converge toward one another to form at least one apex, the at least one apex being sharp, rounded, or truncated.

3. The textured glass article of claim 1, wherein the textured glass article has a surface roughness Ra greater than or equal to 2 μm.

4. The textured glass article of claim 1, wherein the base of each of the plurality of polyhedral surface features comprises at least three sides, at least one side converging toward at least another side.

5. The textured glass article of claim 1, wherein each of the plurality of polyhedral surface features comprises a dendritic structure extending from the base.

6. The textured glass article of claim 1, wherein the textured glass article has a mean surface roughness Sa greater than or equal to 0.75 μm and less than or equal to 10 μm.

7. The textured glass article of claim 1, wherein the textured glass article has a mean root mean square height Sq greater than or equal to 1 μm and less than or equal to 2 μm.

8. The textured glass article of claim 1, wherein the textured glass article has a mean developed interfacial area Sdr greater than or equal to 7% and less than or equal to 25%.

9. The textured glass article of claim 1, wherein the textured glass article has a fastest decay autocorrelation length Sal greater than or equal to 0.020 mm and less than or equal to 0.1 mm.

10. The textured glass article of claim 1, wherein the textured glass article has a mean peak curvature greater than or equal to 8000 $mm^{-1}$ and less than or equal to 17000 $mm^{-1}$.

11. The textured glass article of claim 1, wherein the textured glass article has a location of peak maximum (peak GU) greater than or equal to 50 GU and less than or equal to 150 GU.

12. The textured glass article of claim 1, wherein the textured glass article has a full width at half maximum greater than or equal to 20 GU and less than or equal to 40 GU.

13. The textured glass article of claim 1, wherein the textured glass article has a range of GU values greater than or equal to 100 GU and less than or equal to 250 GU.

\* \* \* \* \*